US008869281B2

(12) United States Patent
Call et al.

(10) Patent No.: US 8,869,281 B2
(45) Date of Patent: Oct. 21, 2014

(54) PROTECTING AGAINST THE INTRODUCTION OF ALIEN CONTENT

(71) Applicant: Shape Security Inc., Palo Alto, CA (US)

(72) Inventors: Justin D. Call, Santa Clara, CA (US); Xiaohan Huang, Cupertino, CA (US); Xiaoming Zhou, Sunnyvale, CA (US); Subramanian Varadarajan, San Jose, CA (US); Marc R. Hansen, Mountain View, CA (US)

(73) Assignee: Shape Security, Inc., Palo Alto, CA (US)

( * ) Notice: Subject to any disclaimer, the term of this patent is extended or adjusted under 35 U.S.C. 154(b) by 0 days.

(21) Appl. No.: 14/055,646

(22) Filed: Oct. 16, 2013

(65) Prior Publication Data
US 2014/0283069 A1 Sep. 18, 2014

Related U.S. Application Data

(60) Provisional application No. 61/801,269, filed on Mar. 15, 2013.

(51) Int. Cl.
G06F 21/00 (2013.01)
H04L 29/06 (2006.01)

(52) U.S. Cl.
CPC .................................. H04L 63/145 (2013.01)
USPC .......................................................... 726/23

(58) Field of Classification Search
None
See application file for complete search history.

(56) References Cited

U.S. PATENT DOCUMENTS

| 7,434,260 | B2 | 10/2008 | Hong et al. |
| 7,480,385 | B2 | 1/2009 | Weber |
| 7,500,099 | B1 | 3/2009 | McElwee et al. |
| 7,665,139 | B1 | 2/2010 | Szor et al. |
| 7,707,223 | B2 | 4/2010 | Zubenko et al. |
| 7,836,425 | B2 | 11/2010 | Rubin et al. |
| 8,020,193 | B2 | 9/2011 | Bhola et al. |
| 8,200,958 | B2 | 6/2012 | Coppola et al. |

(Continued)

FOREIGN PATENT DOCUMENTS

| WO | WO2004109532 A1 | 12/2004 |
| WO | WO2008130946 A2 | 10/2008 |
| WO | WO2013091709 A1 | 6/2013 |

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages , Jun. 2012.

(Continued)

Primary Examiner — William Goodchild
(74) Attorney, Agent, or Firm — Fish & Richardson P.C.

(57) ABSTRACT

In one implementation, a computer-implemented method can identify abnormal computer behavior. The method can receive, at a computer server subsystem and from a web server system, computer code to be served in response to a request from a computing client over the internet. The method can also modify the computer code to obscure operational design of the web server system that could be determined from the computer code, and supplement the computer code with instrumentation code that is programmed to execute on the computing client. The method may serve the modified and supplemented computer code to the computing client.

26 Claims, 8 Drawing Sheets

(56) References Cited

U.S. PATENT DOCUMENTS

| | | | |
|---|---|---|---|
| 8,225,401 | B2 | 7/2012 | Sobel et al. |
| 8,266,202 | B1 | 9/2012 | Colton et al. |
| 8,332,952 | B2 | 12/2012 | Zhang et al. |
| 8,533,480 | B2 | 9/2013 | Pravetz et al. |
| 2007/0011295 | A1 | 1/2007 | Hansen |
| 2008/0222736 | A1* | 9/2008 | Boodaei et al. ............ 726/27 |
| 2009/0070459 | A1 | 3/2009 | Cho et al. |
| 2009/0178059 | A1 | 7/2009 | Lang et al. |
| 2009/0199297 | A1 | 8/2009 | Jarrett et al. |
| 2009/0241174 | A1 | 9/2009 | Rajan et al. |
| 2009/0249310 | A1 | 10/2009 | Meijer et al. |
| 2010/0235637 | A1 | 9/2010 | Lu et al. |
| 2010/0235910 | A1 | 9/2010 | Ku et al. |
| 2010/0257354 | A1 | 10/2010 | Johnston et al. |
| 2011/0023118 | A1 | 1/2011 | Wright |
| 2011/0131416 | A1* | 6/2011 | Schneider ............ 713/172 |
| 2011/0154021 | A1 | 6/2011 | McCann et al. |
| 2011/0296391 | A1 | 12/2011 | Gass et al. |
| 2012/0022942 | A1 | 1/2012 | Holloway et al. |
| 2012/0031969 | A1 | 2/2012 | Hammad |
| 2012/0096116 | A1 | 4/2012 | Mislove et al. |
| 2013/0198607 | A1 | 8/2013 | Mischook et al. |
| 2013/0263264 | A1 | 10/2013 | Klein et al. |
| 2014/0089786 | A1 | 3/2014 | Hashmi |

OTHER PUBLICATIONS

CodeSealer, "CodeSealer," codesealer.com [online] 2013 [captured Aug. 29, 2013]. Retrieved from the Internet: <URL: http://web.archive.org/web/20130829165031/http://codesealercom/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/240021>, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

RSA, "RSA Offers Advanced Solutions to Help Combat Man-In-The-Browser Attacks," rsa.com [online] May 18, 2010 [captured Nov. 11, 2009]. Retrieved from the Internet: <URL: http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL:http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sood and Enbody, "A Browser Malware Taxonomy," Virus Bulletin, Jun. 2011. Retrieved from the Internet: <URL: http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, Retrieved from the Internet: <URL: http://www.secniche.org/papers/VB2011_BRW_EXP_PACKS_AKS_RJE.pdf>, 9 pages.

Sood et al., "The Art of Stealing Banking Information—Form grabbing on Fire," Virus Bulletin, Nov. 2011, Retrieved from the Internet: <URL: http://www.virusbtn.com/virusbulletin/archive/2011/11/vb201111-form-grabbing>, 5 pages.

Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.

Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browseraspx>, 2 pages.

* cited by examiner

PROTECTING AGAINST THE INTRODUCTION OF ALIEN CONTENT

CROSS-REFERENCE TO RELATED APPLICATIONS

This application claims priority under 35 U.S.C. §119(e)(1), to U.S. Provisional Application Ser. No. 61/801,269, filed on Mar. 15, 2013, the entire contents of which are incorporated herein by reference.

TECHNICAL FIELD

This document generally relates to computer security.

BACKGROUND

One common area of computer fraud involves attempts by organizations to infiltrate and compromise computers of ordinary people, and by that action, to elicit confidential information or manipulate otherwise legitimate transactions. For example, via an exploit commonly termed "Man in the Browser," a user's computer can be compromised surreptitiously with malware (i.e., malicious computer programs) that intercepts legitimate communications by the user, such as transactions with the user's bank, and does so after the communications have been authenticated and decrypted, e.g., by a web browser on the computer. Such malware may alter the interface that the user sees, such as by generating an interface that looks to the user like his or her bank is requesting particular information (e.g., a PIN number) when in fact the bank would never request such information via a web page. Alternatively, the malware may generate an interface that indicates to a user that payment transaction was executed as the user requested, when in fact, the malware altered the transaction so as to divert the user's money to the benefit of criminal enterprise.

Various approaches have been taken to identify and prevent such malicious activity. For example, some approaches install defensive software on client computers. Alternative approaches run various kinds of analysis tools on the transactions and/or network traffic on a server system to detect improper activity.

SUMMARY

The exploitation of client-server applications (such as web sites) by malicious programs (malware) on the client (such as a browser) is made more difficult by modifying the legitimate code transmitted to the client in varying manners each time the code is served to the client. Such modifications can be performed by an intermediary system that receives the code as it would normally be served by a web server system, and changes certain elements of that code in random ways (i.e., ways that prevent the malware on client computers from predicting how the normally-served code operates so as to maliciously interact with such code). For example, the names of functions or variables may be changed in various random manners each time a server system serves the legitimate code. Such constantly changing modifications may interfere with the ability of malicious parties to identify how the server system operates and how the web pages are structured, so that the malicious party cannot generate code to automatically exploit that structure for unscrupulous or otherwise unauthorized objectives.

This document describes systems and techniques by which web code (e.g., HTML, CSS, and JavaScript) is modified before it is served over the internet by a server system so as to make more difficult the exploitation of the server system by clients that receive the code (including clients that are infected without their users' knowledge). The modifications may differ for different times that a web page and related content are served, whether to the same client computer or to different client computers. Specifically, two different users (or a single user in two different web browsing sessions) may be served slightly different code in response to the same requests, where the difference may be in implicit parts of the code that are not displayed so that the differences are not noticeable to the user or users. For example, the names that are served to a client device for various software objects may be changed in essentially random ways each time a page is served. A main purpose of such action is to create a moving target with the code, so that malicious code executing on the client computers cannot use predictability of the code in order to interact with the code in a malicious way, such as to trick a user of the client computer into providing confidential financial information and the like.

As such, malicious activity can be both detected and deflected in relatively sophisticated manners by changing the environment in which executable code on the client device, such as JavaScript, operates (in addition to changing corresponding references in the HTML code). Detection can occur by identifying certain JavaScript operations or calls that may be made on a page, and instrumenting code that is served with a web page so as to report to a security server system when such operations occur and/or such calls are made (along with information that describes the actions). Specifically, malicious code may try to call an item that it believes to be part of a static page, where that item is not part of the dynamically altered code that was actually served, and such a false call can be detected and reported. Deflection occurs by the constant changing of code elements as they are served each time, such as changing the names of elements that will be called by malicious JavaScript, so that the malicious code can never catch up with the changes, and thus gives itself away when it tries to interoperate with code known by the system to be stale.

As one example, a common method for making changes to a document object model (DOM) for a web page is the document.write method, and may be used by malicious code to surreptitiously change what the user of a computing device sees on a web page. A security system can (1) instrument served code corresponding to such a method so that the instrumentation code reports calls to the method, and additional includes data that characterizes such calls, so that the system can detect abnormal activity and perhaps use the additional data to determine whether the abnormal activity is malicious or benign; and (2) change the function name to "document.#3@1*87%5.write," "1@2234$56%.4$4$345%4.@12111@", or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumeand continually changed include "getElementById," "getElementByName," XPath commands, and setting of HTML elements in the DOM to particular values.

The modification of code that is described in more detail below may be carried out by a security system that may supplement a web server system, and may intercept requests from client computers to the web server system and intercept responses from web servers of the system when they serve content back to the client computers (including where pieces of the content are served by different server systems). The modification may be of static code (e.g., HTML) and of related executable code (e.g., JavaScript) in combination. For example, the names of certain elements on a web page defined via HTML may be changed, as may references to items external to the HTML (e.g., CSS and JavaScript code). For example, the name of a label may be changed from a name provided by a programmer to an essentially random name like $4@376&8*. Such renaming may occur by first identifying programmatically related elements across the different types of code that are to be served to the client computer (e.g., HTML, CSS, and JavaScript) and grouping such occurrences of elements for further processing (e.g., by generating flags that point to each such element or copying a portion of each such element). Such processing may occur by modifying each element throughout the different formats of code, such as changing a name in the manner above each time that name occurs in a parameter, method call, DOM operation, or elsewhere. The modified elements may then be placed into the code to be delivered to the client computer, by recoding the code that was sent from the web server system, and serving the recoded code. Such a process may be repeated each time a client computer requests code, and the modifications may be different for each serving of the same code.

Such modification of the served code can help to prevent bots or other malicious code operating on client computers from exploiting perceived weaknesses in the web server system. For example, the names of functions or variables may be changed in various random manners each time a server system serves the code. As noted above, such constantly changing modifications may interfere with the ability of malicious parties to identify how the server system operates and web pages are structured, so that the malicious party cannot generate code to automatically exploit that structure in dishonest manners. In referring to random modification, this document refers to changes between different sessions or page loads that prevent someone at an end terminal or controlling an end terminal to identify a pattern in the server-generated activity. For example, a reversible function may change the names when serving the code, and may interpret any HTTP requests received back from a client by changing the names in an opposite direction (so that the responses can be interpreted properly by the web servers even though the responses are submitted by the clients with labels that are different than those that the web servers originally used in the code). Such techniques may create a moving target that can prevent malicious organizations from reverse-engineering the operation of a web site so as to build automated bots that can interact with the web site, and potentially carry out Man-in-the-Browser and other Man-in-the-Middle operations and attacks.

In addition to preventing malicious code from operating properly, the systems discussed here can also identify malicious operation. For example, in addition to or as an alternative to being randomly modified so as to prevent inter-operation at network endpoints by malicious code, the web server code may be supplemented with instrumentation code that is programmed to identify alien content in the rendered web page on the client computer. That instrumentation code that runs on the client may, for example, be programmed to identify a function call for a function name that does not match function calls that are permissible for a particular served web page (e.g., where the alien call may be one that matches a name from the page originally provided by a web server but does not match the revised name generated by the code alteration techniques discussed in the prior paragraph). Such alien content may simply be an indication that the user has installed a legitimate plug-in to his or her browser, or it may also be an indication that the user's computer has become infected with malicious code (e.g., JavaScript code). Additional techniques may be used once alien content is identified so as to determine whether the content is malicious or benign.

The techniques discussed here may be carried out by a server subsystem that acts as an adjunct to a web server system that is commonly employed by a provider of web content. For example, as discussed in more detail below, an internet retailer may have an existing system by which it presents a web storefront at a web site (e.g., www.examplestore.com), interacts with customers to show them information about items available for purchase through the storefront, and processes order and payment information through that same storefront. The techniques discussed here may be carried out by the retailer adding a separate server subsystem (either physical or virtualized) that stands between the prior system and the internet. The new subsystem may act to receive web code from the web servers (or from a traffic management system that receives the code from the web servers), may translate that code in random manners before serving it to clients, may receive responses from clients and translate them in the opposite direction, and then provide that information to the web servers using the original names and other data. In addition, such a system may provide the retailer or a third party with whom the retailer contracts (e.g., a web security company that monitors data from many different clients and helps them identify suspect or malicious activity) with information that identifies suspicious transactions. For example, the security subsystem may keep a log of abnormal interactions, may refer particular interactions to a human administrator for later analysis or for real-time intervention, may cause a financial system to act as if a transaction occurred (so as to fool code operating on a client computer) but to stop such a transaction, or any number of other techniques that may be used to deal with attempted fraudulent transactions.

Various implementations are described herein using hardware, software, firmware, or a combination of such components. In one implementation, a computer-implemented security method can receive, at a computer server system, requests from a plurality of client devices for a common web resource. The method can recode portions of the common web resource that do not substantially affect a presentation of the web resources on the plurality of different client devices, the recoding differing for different ones of the plurality of client devices. The method serves the web resource with the recoded portions to the plurality of different client devices and receives, from the plurality of client devices, responses that result from the serving of the web resource, the responses having different content that depends on how a corresponding instance of the recoding of the portions of the web resource occurred for a particular one of the plurality of client devices. The method can include decoding content in the responses from particular ones of the client devices in a manner that corresponds to a manner in which the portions of the web resource were recoded for the particular ones of the client devices.

This and other implementations can optionally include one or more of the following features. The computer-implemented security method can further include serving the web resource along with instrumentation code that is programmed to execute on the client devices to monitor interaction by other resources on the client device with the web resource. The method can further include receiving, from the instrumentation code that executes on the client devices, reports indicating that the instrumentation code detected abnormal behavior at particular ones of the client devices. Particular ones of the reports can include an indication that an un-recoded form of the web resource attempted to interact with the corresponding client device.

The method can further include receiving, from ones of the plurality of client devices, requests that each respond to corresponding web resources having recoded portions and instrumentation code; modifying the received requests in a manner that is a functional inverse of the recoding of corresponding ones of the portions of the common web resource; and providing modified requests to one or more server systems that served the common web resources. Recoding portions of the common web resource can include changing names of functions in the computer code to obscure operation of a web server system that generated the common web resource. Recoding portions of the common web resource can include changing values of attributes in the computer code that makes up the common web resource. Recoding portions of the common web resource can include changing values associated with at least one of a link, a form, a field, and a function in an HTML document. Recoding portions of the common web resource can include at least one of adding, removing, and rearranging content in a web document.

Serving the recoded portions to the plurality of different client devices can include associating each of the provided recoded portions with a corresponding session identifier, and the received responses that result from serving of the web resource can include the corresponding session identifiers. The method can further include storing information about modifications made in recoding the common web resource in a data structure that is identifiable by the session identifier, and decoding the content in the responses can include identifying the data structure using the corresponding session identifiers in the received responses, and using the information about the modifications that is stored in the data structure. The computer server system can be arranged to recode the common web resource in different manners across multiple different computing sessions from a single one of the plurality of client devices.

In one implementation, a computer system for identifying abnormal computer behavior can include a web server that is configured to provide a resource in the form of computer code to requesting client computing devices; a security intermediary arranged to (i) receive the resource from the web server before the resource is provided to the requesting client computing devices, (ii) process the received resource, and (iii) transmit the processed resource to corresponding requesting client computing devices, wherein processing the received resource includes modifying the computer code for the received resource to obscure operation of the web server system, the modifying being different for different requests from clients for the received resource.

This and other implementations can optionally include one or more of the following features. The security intermediary can be further configured to provide instrumentation code to be served to a corresponding requesting client computing device with the processed resource, the instrumentation code programmed to monitor operation of the resource on the corresponding requesting client computing device. The security intermediary can be further arranged to receive, from the instrumentation code that executes on the corresponding requesting client computing device, a report that the instrumentation code detected abnormal behavior at the corresponding requesting client computing device. The instrumentation code can be programmed to detect alien content interaction with a document object model at a corresponding client computing device. The report can include an indication that the corresponding requesting client computing device attempted to interact with an unmodified form of the computer code. Modifying the computer code for the received resource can include changing names of functions in the computer code.

The security intermediary can be further configured to modify the computer code differently in response to each of a plurality of requests from a particular one of the client computing devices. The security intermediary can be arranged to process the received resource such that the processed resource, when executed by particular ones of the requesting client computing devices, presents a substantially consistent computing experience to users of the requesting client computing devices as a user experience for an unprocessed version of the resource. The computer system can further include a central security server that is configured to receive security information from a plurality of security intermediaries that include the security intermediary and other security intermediaries.

In one implementation, one or more computer-readable tangible devices can have stored thereon instructions that, when executed by one or more processors of a computer system, perform actions or operations that include receiving, at a computer server system, requests from a plurality of client devices for a common web resource; recoding portions of the common web resource that do not substantially affect a presentation of the web resources on the plurality of different client devices, the recoding differing for different ones of the plurality of client devices; serving the web resource with the recoded portions to the plurality of different client devices; receiving, from the plurality of client devices, responses that result from the serving of the web resource, the responses having different content that depends on how a corresponding instance of the recoding of the portions of the web resource occurred for a particular one of the plurality of client devices; and decoding content in the responses from particular ones of the client devices in a manner that corresponds to a manner in which the portions of the web resource were recoded for the particular ones of the client devices.

This and other implementations can optionally include one or more of the following features. The operations or actions can further include serving the web resource along with instrumentation code that is programmed to execute on the client devices to monitor interaction by other resources on the client device with the web resource. Recoding portions of the common web resource can include changing names of functions in the computer code to obscure operation of a web server system that generated the common web resource. Serving the recoded portions to the plurality of different client devices can include associating each of the provided recoded portions with a corresponding session identifier, and the received responses that result from serving of the web resource can include the corresponding session identifiers.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
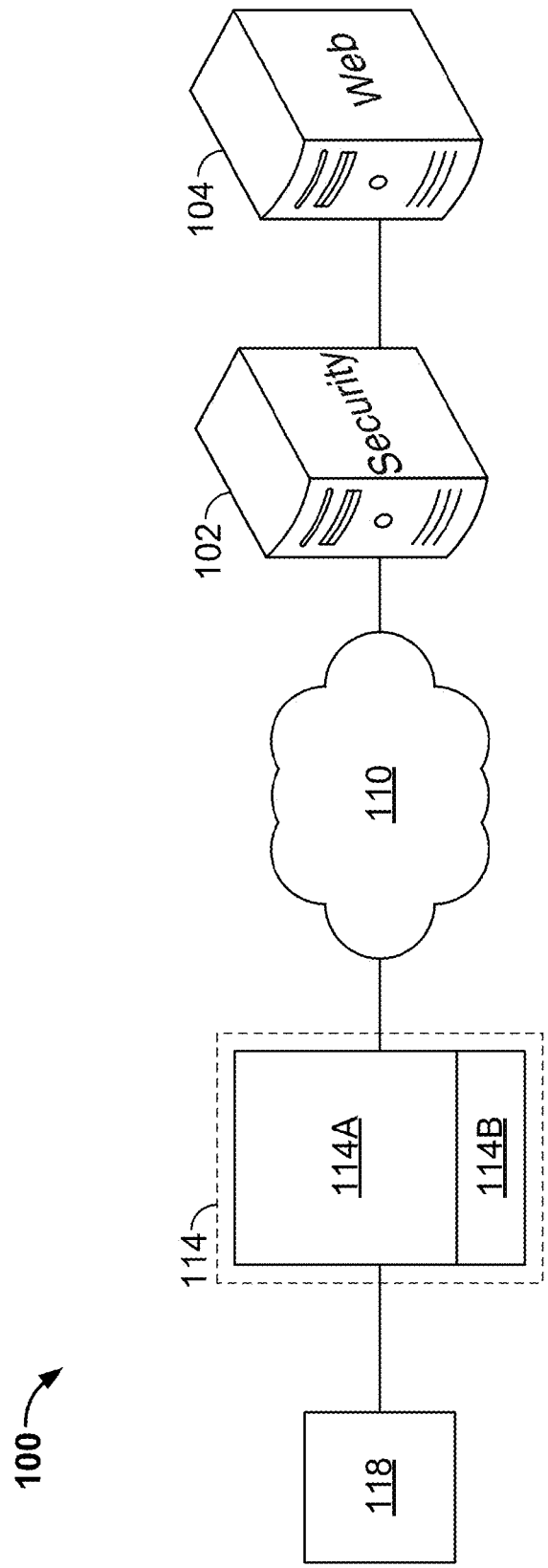
FIG. 1A depicts a schematic diagram of an example system for serving web code and monitoring actions of client computers.

FIG. 1A is a schematic diagram of a system 100 for serving web code and monitoring actions of client computers to identify abnormal behavior and potentially malicious activity. Web code may include, for example, HTML, CSS, JavaScript, and other program code associated with the content or transmission of web resources such as a web page that may be presented at a client computing device 114 (e.g., via a web browser or a native application (non-browser)). The system 100 can detect and obstruct attempts by fraudsters and computer hackers to learn the structure of a website (e.g., the operational design of the pages for a site) and exploit security vulnerabilities in the client device 114. For example, malware 118 may infect a client device 114 and gather sensitive information about a user of the device, discreetly modify an online transaction, or deceive a user into engaging in compromising activity such as divulging confidential information. Man-in-the-middle exploits are performed by one type of malware 118 that is difficult to detect on a client device 114, but can use security vulnerabilities at the client device 114 to engage in such malicious activity.

The system 100 can serve modified and instrumented web code to the client device 114 to detect and obstruct malware 118 attempts to discern and exploit operations of a web server 104. In this example, the modified web code 114A is represented as a portion of a document on the client device 114, while the instrumentation code 114B is represented as another portion of document on the client device 114. Such simplified representation is provided for sake of explanation, though actual delivery and execution of the code may take a variety of forms, including by a web browser on the client device 114 rendering a page and potentially accessing additional code (e.g., CSS code and JavaScript or code from other domains) based on code that is part of the web page, and the browser may build a document object model (DOM) in a familiar manner by such rendering and execution of the provided code. Also, the served code may be executed by a native application.

The system 100 can include a security intermediary 102 that is logically located between the web server 104 and one or more client devices 114. The security intermediary 102 can receive a portion or all of the traffic, including web code, transmitted between client devices, such as client device 114, and the web server 104 (and vice-versa). In compliance with a governing security policy, when the web server 104 provides a resource such as a web page in response to a client device 114 request, the web server 104 can forward the response to the security intermediary 102 (perhaps through a load balancer or other data management devices or applications) so that the web code for the response can be modified and also supplemented with instrumentation code 114B before it is served to the requesting client 114. Modification of the web code may be random in certain manners, and can differ each time a response is served to a client so as to prevent malware 118 from learning the structure or operation of the web server, or from being developed by a malicious organization that learns the structure or operation. Additionally, the web code can be supplemented with instrumentation code that is executable on the client device 114. The instrumentation code 114B may detect when abnormal behavior occurs on the client device 114, such as possible unauthorized activity by the malware 118, and can report the occurrence of such activity to the security intermediary 102.

When security intermediary 102 receives requests (e.g., HTTP requests) from clients in response to modified web code being processed on those clients, it can apply reverse modifications to the requests before forwarding the requests to the web server 104. Additionally, the security intermediary 102 can receive reports from the instrumentation code that indicate abnormal behavior on the client device 114, and the security intermediary 102 can log these events, alert the web server 104 of possible malicious activity, and send reports about such events to a central security server (not shown). The central security server may, in some implementations, analyze reports in the aggregate from multiple security intermediaries 102, and/or reports from multiple client devices 114 and multiple computing sessions and page loads.

Figure 1B:
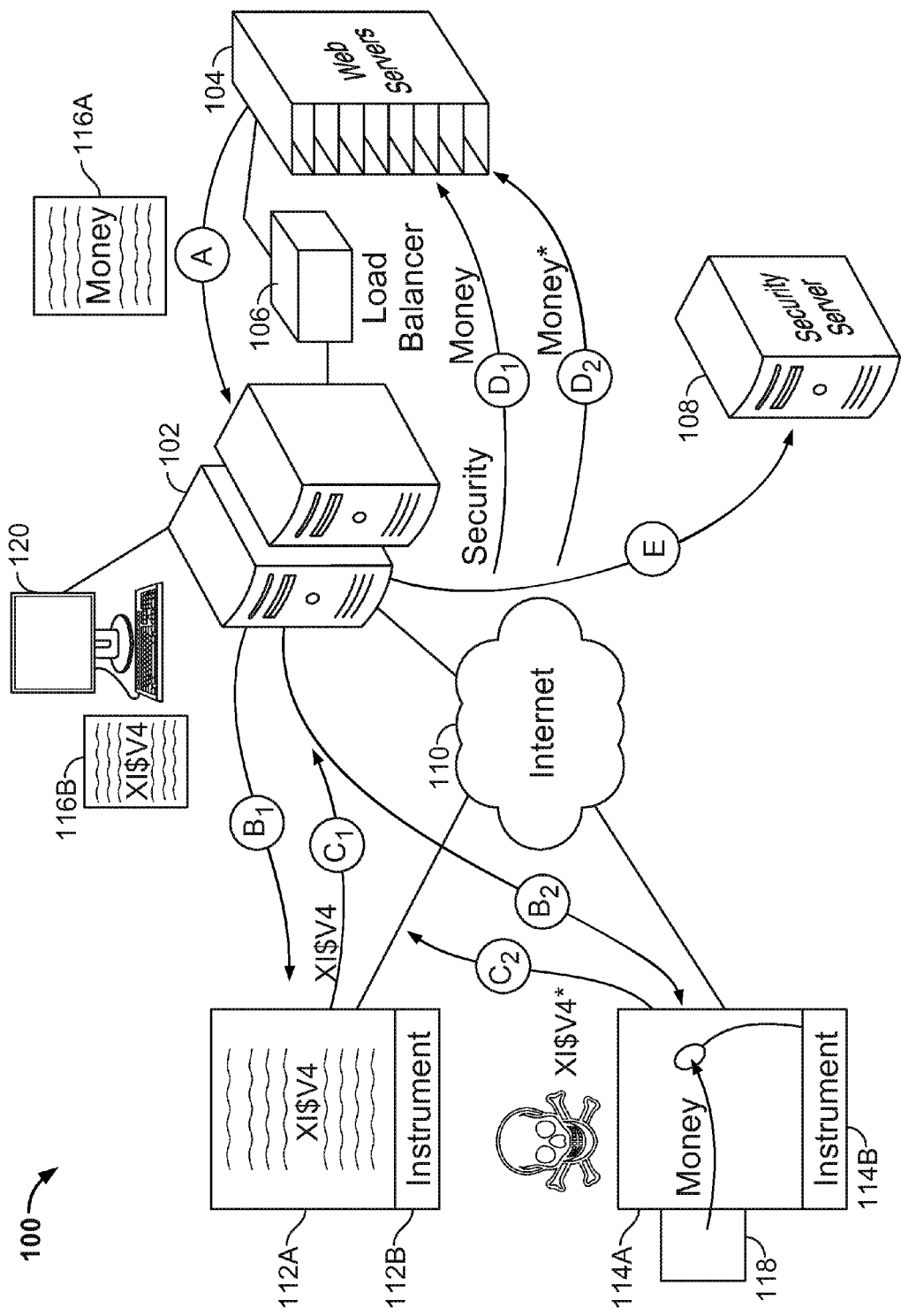
FIG. 1B depicts a system-flow diagram of the example system and example operations of the system for serving web code and monitoring actions of client computers.

FIG. 1B is a schematic diagram of the system 100 depicted in FIG. 1A, shown performing a process for serving code and monitoring actions of client computers to identify anomalous and potentially malicious activity. The system 100 may include a web server 104, security intermediary 102, security server 108, and one or more client devices 112 and 114. Client device 114 has been infected with malware 118 that may attempt to exploit security vulnerabilities at the client device 114 and/or the web server 104, while client device 112 is "clean" or uninfected in this example. For example, the malware 118 may have been written by an organized crime syndicate to identify transactions with a particular bank whose web site structure the syndicate has studied, and may attempt to induce users to provide private information such as PIN codes by recognizing when the bank's web page is loaded by a browser, and interfering with the normal user interface of the bank's web page, such as by generating a pop-up seeking the user's PIN number, in a manner that it looks to the user like the bank generated the pop-up. In an actual implementation, the system 100 would communicate with thousands, tens of thousands, hundreds of thousands, or millions of client devices—some compromised and some clean—over a long time period, though the number here is reduced for the sake of simplification.

The web server 104 (which in normal implementation would be implemented in a large number of physical or virtual servers across one or more data centers, such as in one or more racks of servers) may host electronic resources and provide services over one or more networks such as the internet 110. For example, the web server 104 may serve code for pages of one or more websites by storing resources for each website such as HTML pages, scripts, images, media, and user data at the server 104, and providing the resources upon request. For instance, the web server 104 may receive an HTTP request from a client device 112 that requests the server 104 to provide the client device 112 with a code for generating a webpage. In response, the server 104 retrieves one or more resources associated with the request and transmits them to the requesting client device 112. The server 104 may respond to an HTTP request by serving an HTML file that represents a webpage. The HTML file may reference other resources such as advertisements, images, JavaScript code, or Cascading Style Sheets ("CSS") that the client device 112 can use to load and present the webpage to a user. The web server 104 may provide the referenced files to satisfy the initial request, or may provide the files in response to subsequent requests from the client device 112.

The web server 104 can be implemented with various combinations of software and hardware. In some implementations, the web server 104 can support services other than or in addition to HTTP, including FTP, SSH, TelNet, and/or IMAP, POP, and SMTP for e-mail services. The web server 104 may also support secure connections such as through SSL and HTTPs protocols. Various open-source or commercial software products may be used in implementing the web server 104, such as APACHE web server software or WINDOWS server. Also, the web server 104 can be comprised of one or more computing devices, such as a distributed server system with multiple connected devices that each provide portions of the operations (e.g., as a server bank, a group of blade servers, or a multi-processor system).

The client computing devices 112 and 114 are capable of communicating information with the web server 104 over a network such as the internet 110. The client devices 112, 114 can include any of a variety of desktop or mobile devices such as a desktop, notebook, smartphone, or tablet computers. The client computing devices may include a network interface card or other hardware for communicating over a wired or wireless network that is connected to the internet 110. The client devices 112, 114 may also include software, such as a web browser or one or more native applications, to allow a user of the client devices 112, 114 to request, load, and interact with web resources such as HTML pages and JavaScript applications from one or more websites served by the web server 104.

Malware 118 may be present on one or more client devices that communicate with the web server 104. In FIGS. 1A and 1B, malware 118 has infected the client device 114, but not client device 112. Malware 118 can include any software that exploits operations of a client or server computing system such as the web server 104. Malware 118 may engage in various malicious behaviors, including attempts to gather private, digitally-stored information about users such as identification or financial information. Attackers can also use malware 118 to access secure computer systems without authorization, destroy digital information, or gain control of a computer system from an authorized user. Malware 118 may include viruses, Trojan horses, spyware, adware, and other malicious software. Attackers have developed sophisticated methods to deploy malware 118 on client computing devices 118 without a user's knowledge. For example, using phishing and other social engineering techniques, attackers may deceive users into accessing a resource that installs malware 118 on the user's computing system without notice or detection.

Some malware 118 can exploit security vulnerabilities in the client device 114 (including in a browser or browsers executing on the client device 114) to obtain sensitive user account information and to initiate fraudulent transactions. Attackers may use man-in-the-middle attacks, for instance, to intercept communications between the client device 114 and the web server 104. Even where a secure communication protocol is used between the client device 114 and the web server 104, some malware 118 can intercept communications (e.g., after they have been decoded on the client device 114), log information about the communications, and even alter such communications. In man-in-the-browser attacks, the malware 118 may compromise a web browser at client device 114 such that the malware 118 activates when a user visits a particular website. The malware 118 may access information about the website even after code for the site is decrypted, and in some instances, the malware 118 may inject extra code such as HTML or JavaScript to create malicious forms that prompt users to divulge confidential information that can later be transmitted to attackers for further use. Man-in-the-browser malware 118 may also alter an HTTP request from the client device 114 without the user's knowledge to divert a request to an unauthorized server or to implement a fraudulent transaction. For example, in a banking transaction, malware 118 in the client computing device 114 may alter the destination account number in a wire transfer to deliver funds to a mule account rather than an account specified by the user. Some malware 118 may passively reside in the client device 114 to monitor features of a site so that manual or automated attacks on the site's web server 104 can be made at a later time.

Security intermediary 102 may include one or more computing devices (e.g., physical or virtual server instances) that are situated between the client computing devices 112, 114 and the web server 104. The security intermediary 102 receives and processes at least a portion of traffic transmitted between the web server 104 and other computing devices that interact with the web server 104, such as the client devices 112, 114. In some implementations, the security intermediary 102 may be a physical or virtual subsystem of the web server 104. The security intermediary 102 may be configured to modify and/or analyze web code transmitted to and from the web server 104 to detect alien (i.e., abnormal) and/or malicious transactions, and to obscure operations of the web server 104 by various forms of malware.

The security intermediary 102 receives, or intercepts, traffic transmitted from the web server 104 before the traffic is received by a requesting computer device such as client devices 112 or 114. For example, the security intermediary 102 may receive content from the web server 104 through a direct connection with the web server 104 or through a local area network ("LAN") before transmitting the content over the internet 110 (though after modifying it). Conversely, the security intermediary 102 may also receive incoming traffic that is destined for the web server 104 so that it can process the traffic before it is received by the web server 104. In some implementations, the security intermediary 102 may be configured as a reverse proxy server that appears to clients to host and serve a website or other electronic resources as if it were the web server 104.

In certain implementations, different subserver systems can be used for outgoing service of code and incoming processing of requests, with the subsystems communicating with each other so that one system can provide reverse translations to the translations originally provided by the first subsystem. Such coordination may occur by maintaining a communication channel between the two subsystems and sharing information for modifying and reverse modifying content. Such coordination may also occur, whether a single security subsystem is used or multiple subsystems are used, by storing a cookie or similar identifier on client devices 112, 114. The identifier that is stored in such a manner can be provided by a client device that stores it, to the security intermediary 102 or similar part of the system 100, and may be used there to reverse transform content that is received back from the particular client device.

The security intermediary 102 may include one or more computing devices that are separate from computing devices of the web server 104. In such implementations, the security intermediary 102 may communicate directly with the web server through a networking cable such as an Ethernet cable or fiber optic line (and typically through many such connections). The intermediary 102 can also communicate with the web server 104 through other components in a network such as a local area network ("LAN"). In some instances, the intermediary 102 can be installed on the same premises as the web server 104 so that operators or administrators of the web server 104 can also maintain the intermediary 102 locally (particularly for large-volume applications). Installing the intermediary 102 in close proximity to the web server 104 can have one or more additional benefits including reduced transmission latency between the intermediary 102 and the web server 104 and increased security that stems from a private connection between the intermediary 102 and the web server 104 that is isolated from public networks such as the internet 110. This configuration can also avoid any need to encrypt communication between the intermediary 102 and the web server 104, which can be computationally expensive and slow.

In some implementations, the security intermediary 102 may include one or more computing devices that are separate from the computing devices of the web server 104, and that are connected to the web server 104 through a public network such as the internet 110. For example, a third-party security company may maintain one or more security intermediaries 102 on the security company's premises. The security company may offer services to protect websites and/or web servers 104 from exploitation according to the techniques described herein. The security intermediary 102 could then act as a reverse proxy for the web server 104, receiving outbound traffic from the web server 104 over the internet 110, processing the traffic, and forwarding the processed traffic to one or more requesting client devices 112, 114. Likewise, the intermediary 102 may receive incoming traffic from client devices 112, 114 over the internet 110, process the incoming traffic, and forward the processed traffic to the web server 104 over the internet 110. In this configuration, communication between the security intermediary 102 and the web server 104 may be encrypted and secured using protocols such as HTTPS to authenticate the communication and protect against interception or unauthorized listeners over the internet 110. (Similarly, communications with client devices can also be secured in similar manners.) In some embodiments, a private line or network may connect the web server 104 to the remote security intermediary 102, in which case the system 100 may use unencrypted protocols to communicate between the intermediary 102 and web server 104. Also, in such a situation, fewer than all of the pages served may be modified using the security intermediary 102, if such processing introduces unwanted lag and delay.

In some implementations, security intermediary 102 may be a virtual subsystem of web server 104. For example, the one or more computing devices that implement web server 104 may also include software and/or firmware for the security intermediary 102. The system 100 may include the security intermediary 102 as software that interfaces with, and/or is integrated with, software for the web server 104. For example, when the web server 104 receives a request over the internet 110, the software for the security intermediary 102 can first process the request and then submit the processed request to the web server 104 through an API for the web server 104 software. Similarly, when the web server 104 responds to a request, the response can be submitted to the security intermediary 102 software through an API for processing by security intermediary 102 before the response is transmitted over the internet 110.

In some configurations of the system 100, two or more security intermediaries 102 may serve the web server 104. Redundant security intermediaries 102 can be used to reduce the load on any individual intermediary 102 and to protect against failures in one or more security intermediaries. The system 100 can also balance traffic among two or more security intermediaries 102. For example, the system 100 may categorize traffic into shards that represent a logical portion of traffic to or from a website. Shards may be categorized according to client identity, network information, URL, the domain or host name in an HTTP request, identity of resources requested from the web server 104, location of resources requested from the web server 104, and/or the content of a request or the requested resource 104.

The security intermediary 102 can process traffic transmitted to and from the web server 104. Such processing of traffic may include reversibly modifying web code to obscure elements of resources provided by the web server 104, and/or inserting instrumentation code into web code provided by the web server 104 to facilitate detection of alien or malicious activity at the client computing devices 112, 114 (e.g., to identify and report in such activity). The security intermediary 102 can also apply reverse modifications on requests or other information transmitted by client devices 112, 114. Reverse modifying of requests can effectively make the security intermediary's 102 operations transparent to the web server 104. This document sometimes refers to reverse modifications as inverse modifications and these terms are intended to have the same meanings unless indicated otherwise.

The security intermediary 102 can make various modifications to outgoing web code (web code heading for a client). In one example, the security intermediary 102 can make random or pseudo-random changes (both of which are covered by the term "random" in this document unless indicated otherwise) in HTML attribute values in links or forms, which the client devices 112, 114 may translate directly into HTTP protocol elements in subsequent requests to the web server 104. For instance, a web server 104 for an online retailer at www.examplestore.com can provide a text field in a checkout page for a user at the client device 112, 114 to input his or her shipping address. The original HTML web code from the web server 104 may include an HTML tag to create the field: <input type="text" name=shippingaddress>.

To obstruct attempts by malware 118 that may have compromised the client device 114 to exploit the field and engage in a fraudulent transaction, the security intermediary 102 can replace one or more attributes for the field, such as by generating a pseudo-random value for the 'name' attribute to replace 'shippingaddress.' The security intermediary 102 may then forward the modified HTML for the webpage to the client device 114 (either directly or some other server-side intermediary).

The client device 114 may then generate HTTP requests for the web server 104 that include the modified attribute, such as in a POST request that references the pseudo-random 'name' attribute value. For example, such requests may be generated in response to a user of the client device 114 interacting with a rendered web page and other related content. When the security intermediary 102 receives the client device 114 POST request, it applies a reverse modification to the attribute value, replacing the pseudo-random value with the original 'shippingaddress' value, and then forwards the request to web server 104.

Data for making the reverse translation correspond to the initial translation may be stored and obtained by the security intermediary 102 in different manners. For example, the security intermediary 102 may store or access translation tables to apply the reverse modifications (stored local to that security intermediary 102 or accessible to multiple such intermediaries in a large system, so that different intermediaries may handle requests as compared to what intermediary served the web content), or use encrypted content in information associated with the request to apply reverse modifications (e.g., which can be stored in a cookie or similar structure on the client device 114). Further explanation and examples of security intermediary 102 operations, including techniques for detection and deflection of unauthorized activity, are discussed in further detail with respect to FIGS. 2-4.

The security intermediary 102 can apply different modifications to web code each time the code is served to one or more client devices 112, 114—whether different for the different servings to a single device (e.g., as between different web sessions with a site) or for different servings to different devices. Modifications may vary across different users, different clients 112, 114, different sessions, and even different page loads for the same user. For example, a user at client device 112 may receive a particular page with one set of modifications during a first session, and a different, second set of modifications during a different session. Similarly, for two different users at client devices 112 and 114, respectively, that request the same resource from web server 104, the security intermediary 102 may apply different modifications to each resource, even if the users made their requests at substantially the same time. By modifying content differently each time it is served, the security intermediary 102 creates a moving target that obstructs attempts by malware 118 to determine a "normal" structure of the site or to identify patterns in the structure of a site. Performing such random modifications makes it more difficult for malware 118 to successfully initiate a fraudulent transaction with the web server 104 or otherwise engage in unauthorized activity. Applying different or unique modifications, whether page-to-page or session-to-session, before the code is ultimately delivered to the client devices 112, 114 can frustrate attempts by malware 118 in any of the client devices 112, 144 to study and/or exploit the structure of a website or other web application.

The system 100 may also include a load balancer 106, which can function as a reverse proxy and distribute incoming traffic from client devices 112, 114 among one or more web servers 104 and/or one or more security intermediaries 102. The load balancer 106 can be connected to a network such as the internet 110, one or more web servers 104, and one or more security intermediaries 102. The load balancer 106 analyzes incoming traffic (e.g., traffic destined for the web server 104) and may categorize the traffic into shards. Traffic may be distributed, for example, based on a Layer 4 transport or network layer analysis, or based on a Layer 7 application layer analysis. For example, FTP requests may be channeled to a web server 104 configured to process FTP requests, whereas HTTP requests may be channeled to a web server 104 configured to process HTTP requests. Similarly, in Layer 7 analysis, the load balancer 106 may distribute incoming traffic based on the content of an HTTP header or content of the application message itself. For instance, at an online banking website for www.examplebank.com, certain pages on the site may be unrelated to a customer's online banking experience, such as privacy and terms of use pages for the site. At these pages, the customer does not interact with his bank account, and the customer can only consume or request information from the page, but he cannot post information to the web server 104 from that page (at least not information that would be a concern for a botnet). These pages may be deemed a low security risk and the load balancer 106 can be configured to identify low risk pages from HTTP requests in incoming traffic. The load balancer 106 may forward low risk traffic directly to the web server 104 and bypass the security intermediary 102—or may pass information to the web server 104 so that the web server 104, when responding to the request, can determine whether a request or response should be processed by the security intermediary 102.

The load balancer 106 can also distribute traffic among multiple security intermediaries 102. In one example, incoming traffic can be distributed so that each security intermediary 102 maintains a substantially equal load as the other intermediaries 102 or receives a substantially equal amount of traffic as the other intermediaries 102. In some instances, incoming traffic may be responsive to previously transmitted web code that had been processed and modified by a particular security intermediary 102. The load balancer 106 may distribute such incoming traffic to the particular security intermediary 102 that generated the previously modified code so that the particular security intermediary 102 can apply a reverse modification to web code in the incoming traffic based on a transformation table that may be stored locally on the particular security intermediary 102. In some implementations, however, transformation tables may be shared or accessible by one or more other security intermediaries 102, or modifications may be stateless at the server system (e.g., at the security intermediary 102), so that web code from incoming traffic can be distributed to any intermediary 102.

Once incoming traffic has been distributed to and processed by a security intermediary 102, the load balancer 106 may receive the processed traffic from the security intermediary 102 and forward the traffic to the web server 104.

The load balancer 106 can also distribute outgoing traffic from the web server 104 for processing by a security intermediary 102 before the traffic is transmitted to the client device 112, 114. Similar to the manner in which it analyzes incoming traffic, the load balancer 106 may categorize outgoing traffic into shards based on information in the network, transport, or application layers of the traffic. The load balancer 106 may determine that some traffic shards may bypass the security intermediary 102 and may by transported over the internet 110 for transmission to a client device 112, 114. Other shards may be distributed to one or more security intermediaries 102 for processing. In implementations of the system 100 that include multiple security intermediaries 102, the load balancer 106 may distribute outgoing traffic to maintain generally equivalent loads among the multiple intermediaries 102. The security intermediaries 102 can then transmit processed traffic back to the load balancer 106 for delivery to client devices 112, 114 over the internet 110.

A configuration module 120 can be used to monitor the system 100 and to configure various aspects of the operation of the system 100. An administrator can use the configuration module 120 (e.g., from a GUI presented on a computer terminal operated by the administrator) to provide system updates, change and load one or more system policies, manage users, select an operation mode, define how to handle exceptions, and/or monitor the health and status of the system 100.

In one implementation, an administrator may use the configuration module 120 to update system software to improve the performance and security of the system 100. As the system 100 is deployed for periods of time in the field, malware 118 designers may attempt to learn about the system 100 and exploit any detected security vulnerabilities. To prevent this, the system 100, including, for example, the security intermediary 102, can be updated with new software that patches security vulnerabilities and improves system performance.

New features may also be introduced such as new algorithms for modifying web code or implementing instrumentation code.

The administrator can also use the configuration module 120 to select or change different system policies. For example, particular modification modes may be selected. The administrator can choose whether the security intermediaries 102 should apply modification techniques that involve only modifying a web application's implicit API (e.g., form fields, links, AJAX calls), for example, or if instrumentation code or other content should be supplemented with the web code.

The administrator can also configure how sessions are managed. For example, the security intermediary 102 can be configured to apply a unique session ID each time a client device 112, 114 makes a new request for a web application, or a particular session can be made to last across multiple requests, such as when a user browses multiple pages while logged into a secure account.

The configuration module 120 can also facilitate management of resource families, which are categories of requests and electronic content for which a particular security policy applies. Thus, the system 100 may allow one or more resource families to bypass operations of the security intermediary 102, while resources in other families must pass through the security intermediary 102 for modification or analysis before being delivered to a client device 112, 114. In some instances, resource families can be defined by directories, uniform resource indicators (URIs), uniform resource locators (URLs), subdomains, or other logical locations of particular resources on a site that is served by the web server 104. If a web server 104 serves multiple sites or multiple domains, different policies may apply among the different sites and/or domains. An administrator can create, modify, and remove resource policies at the configuration module 120, and can indicate which security policy or policies to apply to various families.

An administrator 120 can also configure how the system 100 should apply various security policies based on factors other than or in addition to resource families. For instance, different policies may apply based on characteristics of the device that is making the request or the network on which the requesting device is on (e.g., requests from networks in certain geographic areas may be treated differently than other requests, or requested from certain reputable providers may be scored differently than those from less reputable providers). The security intermediary 102 may determine identities of client devices 112, 114 for which a security threat has previously been identified, or it may recognize an account or IP address of a user that has previously been associated with security threats. The administrator may configure the system 100 to apply more restrictive security policies to particular requesting client devices 112, 114 or users than would otherwise apply based on the family of the requested resource alone.

At the direction of an administrator or other user with appropriate system privileges, the configuration module 120 can change operating modes in the security intermediary 102 and/or adjust the security policy of one or more resource families, clients, or networks. In other words, the administrator may establish a number of security profiles that each set a number of different parameters, and may switch between those profiles, or the administrator may change particular parameters. The security intermediary 102 may be capable of various modification modes that the administrator can apply to a resource family, for example. In some modes, very subtle modifications may be made to elements of the web code in order to detect anomalous or malicious activity, whereas other modes may apply increasingly more complex or widespread modifications that are aimed at preventing unauthorized activity. In particular implementations, policy settings or mode changes can be triggered automatically by the configuration module 120.

The configuration module 120 can also allow an administrator to specify how the security intermediary 102 should respond to exceptions. Exceptions can relate to internal system errors or to detection of fraud, malware, abnormal behavior (e.g., from alien code that has not yet been determined to be malicious or benign), and/or malicious activity in traffic received from a client device 112, 114. Internal system errors may be logged and transmitted to security server 108 (discussed in more detail below) for further analysis or storage.

For instances of detected fraud, malware, or alien or malicious web code, the security intermediary 102 can be configured to respond in one or more ways. For example, the intermediary 102 may log the event (either by itself or having another component of the system add to a log) and transmit it to security server 108 for further analysis. In some implementations, the security intermediary 102 may alert the web server 104 of suspected unauthorized activity, so that the web server 104 can respond in a particular way. For example, in a banking transaction involving suspected fraud, the system 100 can be configured to process the transaction normally, log the transaction, and alert various parties or authorities. Alternatively, the transaction can be thwarted if the security intermediary 102 is configured to alert the web server 104. The web server 104 can respond to a fraud alert by generating a web resource for delivery to an infected or fraudulent client device 114, where the response indicates that the transaction was processed as requested, when in fact it was not. (In such a situation, separate communications may occur to alert a user that a potential attempt at fraud occurred, such as by sending an email to a predetermined account of the user, or making a telephone call to the user.)

The administrator may also manage users via the configuration module. For example, various user categories may provide system users with varying levels of use and access privileges to the system 100. In one implementation, the system 100 may provide four user categories: super-users, system operators, analysts, and auditors. Super-users can create other users and are able to access and perform any action provided for by the system 100. The administrator may be a super-user, for instance. System operators can configure the system 100 and view data from the system 100, but cannot manage other users. Analysts can view data from the system 100, but they cannot modify the system's configuration. Finally, an auditor can view a limited set of system data such as how the system was used and by whom.

The configuration module 120 can also provide a portal for managing various other system settings such as those that may be required for installation and setup of the security intermediary 102, or to configure a particular system setup, such as registration with a security server 108, interoperability with the load balancer 106, and arrangements of multiple security intermediaries 102. The configuration module 120 can be accessible at a terminal on the premises of the security intermediary 102 and can be separate from or integrated with the security intermediary 102. In some implementations, the configuration module 120 can be accessible remotely, such as through an interface at a desktop or mobile computing device that can communicate with the security intermediary 102 through a network.

The security server 108 can receive and analyze security event information from the security intermediary 102 (and in some implementations from many security intermediaries).

Security event information can include logs and alerts generated by the security intermediary 102 that indicate when the intermediary 102 detects anomalous or malicious activity. Feedback from instrumentation code that the security intermediary 102 supplements with the web code for particular web resources may indicate such anomalous or malicious activity. Likewise, a request from an infected client device 114 that calls an unauthorized function that does not match modifications for a given session may generate an alert by the security intermediary 102.

Information about security events can be forwarded to the security server 108. In one example, the security server 108 can be dedicated to events received from one or more security intermediaries 102 that serve a particular web server 104. In some implementations, the security server 108 can be a centralized server that receives security event information from a plurality of security intermediaries 102 that serve multiple web servers 104 and/or websites. Information on security events 108 from multiple sites can be analyzed in aggregate to study developing security threats, determine whether some anomalous activity may nevertheless be benign (such as traces from an authorized or legitimate browser plug-in), to publish statistics or report information on security events to interested parties, and/or to use in developing updates and improvements to the system 100 for increased performance and security. The security server 108 can analyze information from across multiple computing sessions and/or multiple clients as well.

The security server 108 can also receive operating information from the security intermediary 102 that can be used to monitor system performance. For instance, the security intermediary 102 may track and report information about the speed and volume of modifications that it makes to web code, or information about its usual and peak operating levels. The information can be used to make or recommend system configurations to optimize performance and to compare information from multiple security intermediaries 102 deployed across multiple web servers 104.

Communication between the security intermediary 102 and the client devices 112, 114 can occur over one or more networks, including the internet 110. In some implementations, each client computing device 112 and 114 may connect to a network such as a local area network ("LAN") or a wide area network ("WAN") that is in turn connected to the security intermediary 102 through the internet 110. In some implementations, the system 100 may be installed on a private network rather than, or in addition to, the internet 110. Communications over the internet 110 can be encrypted and verified such as with HTTPS (a combination of HTTP and Secure Sockets Layer ("SSL") protocols).

Describing now one particular example of the operations of the system 100 with reference to FIG. 1B, at step A, the web server 104 responds to a request from client devices 112 and 114 for an electronic resource. The web server 104 accesses or generates the resource, which in the example is a webpage 116A relating to a financial transaction. For instance, the web server 104 may serve an online banking site, www.example-bank.com. The webpage 116A may provide forms for account holders at the client devices 112 and 114 to institute an electronic wire transfer. The forms may include fields that allow the account holders to indicate a source account, a destination account, and the amount to transfer. The webpage 116A may implement the form with HTML tags such as <form> and <input> tags that are each identified by a name. For instance, the destination account field is named "money_dest." The client devices 112 and 114 can use the names in submitting form data to the web server 104 through a GET or POST HTTP request method, for example.

Before the system 100 transmits the webpage 116A (or more precisely code that when rendered or otherwise executed by a browser application generates the webpage 116A) over the internet 110 and to each of the client devices 112 and 114, the webpage 116A is directed to the security intermediary 102. The load balancer 106 may determine which security intermediary 102 to direct the webpage 116A to in implementations where there may be multiple, redundant security intermediaries 102. A policy engine at the security intermediary 102 may determine how the security intermediary 102 will process the webpage 116A. For example, the policy engine may determine that the webpage 116A, which pertains to sensitive financial transactions, is part of a resource family that the intermediary 102 has been configured to modify and for which it is to insert instrumentation code. Other resources from the banking site, such as its homepage, may contain less sensitive information and may be subject to lower-level security policies such that the security intermediary 102 may handle the homepage with less sensitivity than the wire transfer webpage 116A.

At steps B1 and B2, the security intermediary 102 processes the webpage 116A according to the governing security policy and transmits processed webpage 116B to client devices 112 and 114. First, the security intermediary 102 may modify elements of the webpage's 116A implicit API, such as field names, function names, and link references. In the example operations of the system 100, the security intermediary 102 changes the name of the destination account field in webpage 116A from "money_dest" to "x1$v4." The name change obscures the identity of the field to prevent malware 118 from learning how to exploit the field. Moreover, the security intermediary 102 can apply different pseudo-random modifications each time the webpage 116A is served to prevent the malware 118 from tracking patterns that the malware 118 could use to exploit the web server 104 or initiate a fraudulent transaction, for example. Other techniques for obscuring content, including obscuring the environment in which web code such as JavaScript operates, are discussed further herein.

Second, the security intermediary 102 can insert instrumentation code into the webpage that can detect certain activity that may indicate alien content (e.g., malware 118 or legitimate code on a client device 112 or 114 that interacts with a web page such as a browser plug-in), and can report the detected activity back to the security intermediary 102 and/or a central security server 108.

Instrumentation code may also collect information about particular activity that occurs on the client device 112 and/or 114. For instance, the instrumentation code may collect information about how a user interacts with the web page such as key strokes, mouse movements, changes in focus between particular forms, fields, or frames, and patterns and timing of interactions with the page. Information about the user's operating environment may also be collected, such as network configurations, operating system information, hardware specifications, performance indicators, session identifiers, other cookies, browser type, browser settings, IP address, MAC address, client device type, plug-ins, screen resolution, installed fonts, timestamp, site or page identifier, GPS data, etc. In some implementations, users and system operators can configure the instrumentation code to restrict or anonymize the data that it gathers to respect user privacy.

The security intermediary 102 can also include an identifier, such as a session identifier in a cookie, with the processed web page 116B that it transmits. The security intermediary 102 can store the identifier in a data structure, table, or database that correlates the original web code with the modified web code for a particular resource so that the security intermediary 102 can apply reverse modifications to requests based on modified resources before forwarding the request to the web server 104. For example, the security intermediary 102 may assign a unique identifier to the webpage 116A, and store the identifier in a table that associates the resource's original field name, "money_dest," with the modified field name "x1$v4." Later transactions posted to the web server 104 from the modified page 116B can be received by the security intermediary 102 for reverse modification before forwarding the request to the web server 104. The security intermediary 102 can determine which reverse modifications to apply based on the identifier. In some implementations, the identifier can be a session identifier.

At step C1, client device 112 has received the modified (i.e., processed) web code of web page 116B. Client device 112 is a clean device in that no malware 118 that is configured to attack the online banking website has infected client device 112. A user at the client device 112 provides into the fields on the web page 116B the necessary information to complete a wire transfer, such as an indication of the source account, destination account, and transfer amount. The user may then submit the request for a wire transfer, which a browser on the client device 112 converts into an HTTP request to the web server 104, the request including the information submitted by the user along with corresponding field names. The HTTP request from client device 112 uses the random field name that the security intermediary 102 generated for the destination account field, "x1$v4."

Instrumentation code 112B can monitor the webpage 116B on client device 112. In some implementations, the instrumentation code 112B may determine that malware 118 or other anomalous activity has altered the webpage 116B and may be attempting to initiate an unauthorized transaction. For example, the instrumentation code 112B may include information about the modified web code for web page 116B, and may be programmed to detect when elements of the modified code are altered at the client device 112. For instance, the instrumentation code may determine whether the document object model ("DOM") for the webpage has been altered, or if the HTTP request based on the webpage uses unexpected values that do not correspond to the modified web code delivered in web page 116B. For instance, the instrumentation code may detect that the client device 114 has called an original function value rather than its modified, replaced value.

Malicious activity can be both detected and deflected in relatively sophisticated manners by changing the environment in which executable code on the client device, such as JavaScript, operates. Detection can occur by identifying certain JavaScript operations or calls that may be made on a page, and instrumenting code that is served with a web page so as to report to a security server system when such operations occur and/or such calls are made (along with information that describes the actions). Deflection occurs by the constant changing of code elements as they are served each time, such as changing the names of elements that will be called by malicious JavaScript, so that the malicious code can never catch up with the changes and thus gives itself away when it tries to interoperate with code known by the system to be stale. As one example, a common method for making changes to a DOM for a web page is the document.write method, and may be used by malicious code to surreptitiously change what the user of a computing device sees on a web page.

A security system can (1) instrument served code corresponding to such a method so that the instrumentation code reports calls to the method, and additionally includes data that characterizes such calls, so that the system can detect abnormal activity and perhaps use the additional data to determine whether the abnormal activity is malicious or benign; and (2) change the function name to "document.#3@1*87%5.write" or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumented and continually changed include "getElementById," "getElementByName," XPath commands, and setting of HTML elements in the DOM to particular values.

As instrumented code executes on the client devices 112, 114, the code may collect information that characterizes events and statuses of a web page or other resource as described, and may report the information in various manners. In some implementations, the instrumentation reports that include such information can be sent to the security server 108 and/or the security intermediary 102. The security server 108 may receive instrumentation reports directly from the client devices 112, 114, or indirectly through the security intermediary 102. The instrumentation code may generate and transmit reports periodically or upon request, for instance. Reports can also be transmitted in subsequent HTTP requests from the client device 112, 114 to the web server 104, and can be received by the security intermediary 102. Alternatively or in addition to these techniques, instrumentation reports can be sent to the security intermediary 102 or security server 108 asynchronously, such as through the use of AJAX or WebSocket.

At step C1, malware 118 has not interfered with the transaction, and the HTTP request includes the appropriate modified field names such as "x1$v4" for the "money_dest" field. Therefore, the instrumentation code 112B does not report the presence of anomalous or malicious activity to the security intermediary 102.

At step C2, client device 114 is shown to have received the modified (i.e., processed) web code for web page 116B. Unlike client device 112, however, client device 114 is compromised with malware 118, such as a man-in-the-browser bot. When a user of the compromised client device 114 submits the wire-transfer transaction, the malware 118 may intervene and replace the destination account field name with "money_dest"—the original field name before the security intermediary 102 modified web page 116A. The bot may use the original field name, for example, based on previous analysis of the banking website in instances where the security intermediary 102 did not modify the field name.

The instrumentation code 114B can detect the behavior or consequences of the behavior of malware 118, and generate a report to alert the security intermediary 102 and/or the web server 104 of suspicious activity. The instrumentation code 114B in FIG. 1B, for example, reports the suspicious activity by causing the HTTP request that the user submits for the transaction to include the field name "x1$v4*" in place of the malware's 118 field name "money_dest." The asterisk appended to the end of the modified field name indicates that the instrumentation code 114B detected suspicious activity.

At steps D1 and D2, the security intermediary 102 receives the HTTP requests for the wire-transfer transaction from client devices 112 and 114, decodes the requests, and forwards the decoded requests to the web server 104. The HTTP requests from the client devices 112 and 114 may include a cookie having a session identifier that the security intermediary 102 can use in decoding the HTTP requests. The security intermediary 102 can lookup the session identifier in a translation table, and decode the request by applying reverse modifications that restore the original field and function names, for example. With respect to the request that the intermediary 102 receives from the clean client device 112, the intermediary 102 receives the substitute field name "x1$v4" as expected, decodes the field name by replacing it with "money_dest" and forwards the request to the web server 104 through the load balancer 106. The operation of security intermediary 102 is transparent to the web server 104, and the web server 104 can process the transaction according to the user's request.

With respect to the HTTP request from the compromised client device 114, the security intermediary 102 recognizes the report of suspicious activity by instrumentation code 114, and sends an alert to the web server 104. The security intermediary 102 can use the session identifier in the HTTP request to determine the appropriate reverse modifications necessary to decode the request. The security intermediary 102 may recognize that the field name "x1$v4*" corresponds to the original "money_dest" field name, but that the instrumentation code 1148 appended an asterisk to the field name to indicate possibly malicious activity.

The security intermediary 102 can respond to the indication in various ways according to the applicable security policy and/or system configuration settings. In one example shown in step D2, the intermediary 102 forwards the decoded request to the web server 104, but appends the asterisk to the destination account field name, "money_dest*," to notify the web server 104 that the transaction is suspicious, and may indicate the presence of unauthorized alien content. In response, the web server 104 may ignore the alert, complete the transaction and log the alert, refuse to complete the transaction, pretend to complete the transaction, and/or take other appropriate action. In some implementations, the security intermediary 102 may not forward the transaction request to the web server 104 if suspicious activity has been detected.

At step E, the security intermediary 102 may forward information about the transactions between the web server and the client devices 112 and/or 114 to the security server 108. For example, the security intermediary 102 may share information about the transaction from client device 114 in which the instrumentation code 114B reported suspicious activity.

The instrumentation code 114B may include a report about the detected suspicious activity and its circumstances that the security intermediary 102 can provide to the security server 108. For example, the report may include information about the client device 114, the abnormal or suspicious activity, the electronic resources and fields involved, and information about the browser, operating system, or other application that the malware 118 may have compromised. Data from the security server 108 can be analyzed with respect to the security intermediary 102 for a particular site, or in aggregate with information from other security intermediaries 102 that serve other websites and web servers 104. The security server 108 can analyze data across multiple computing sessions and for multiple client devices. The analysis from the security server 108 can be used, for instance, to identify new threats, track known threats, and to distinguish legitimate abnormal or alien activity from malicious activity.

Figure 2:
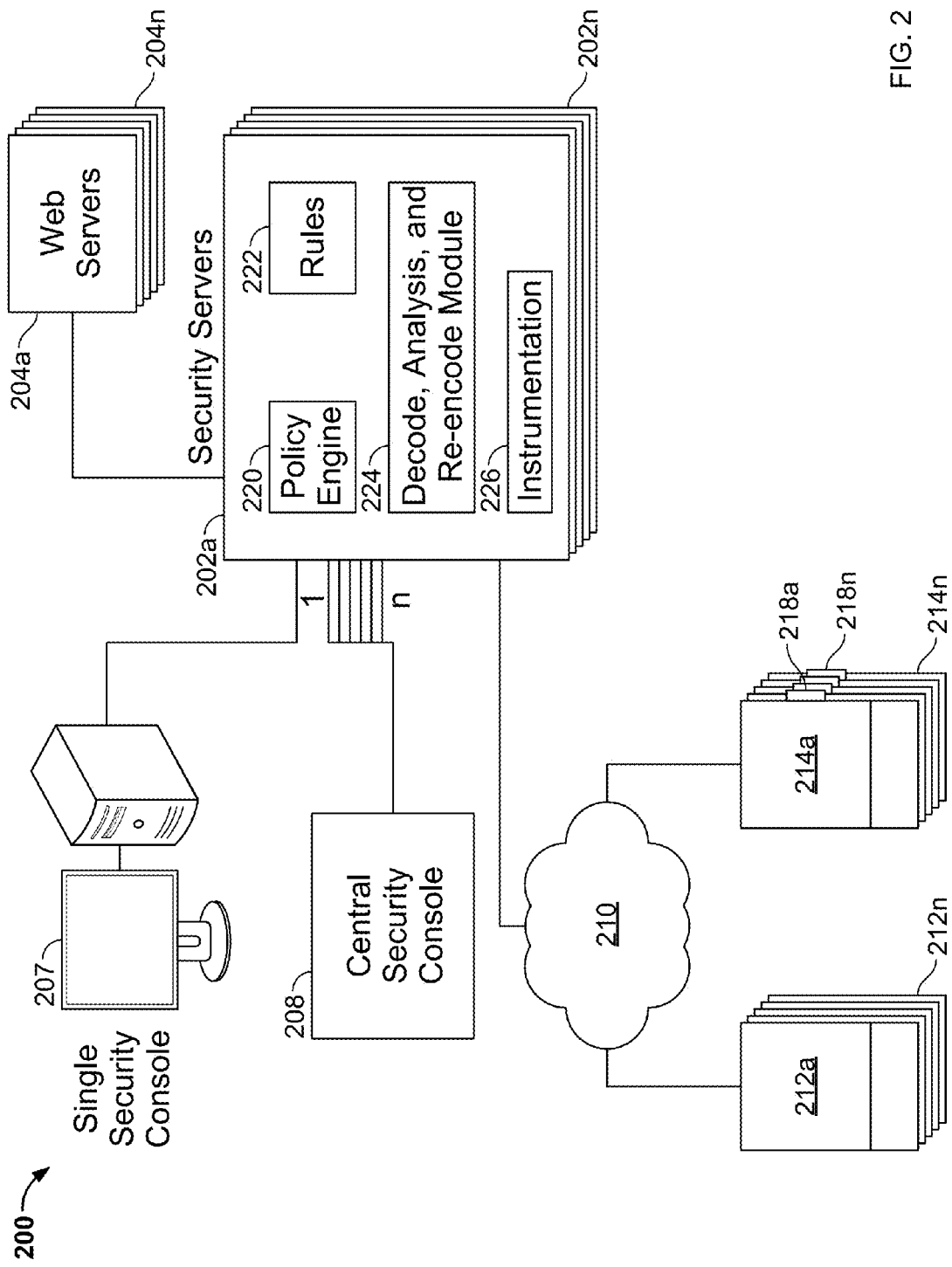
FIG. 2 is a schematic diagram of a system for performing deflection and detection of malicious activity with respect to a web server system.

FIG. 2 is a schematic diagram of a system 100 for performing deflection and detection of malicious activity with respect to a web server system. The system 100 may be the same as the system 100 discussed with respect to FIGS. 1A and 1B, and is shown in this example to better explain the interrelationship of various general features of the overall system 200, including the use of instrumentation code for detection and deflection that is discussed in greater detail throughout this document.

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie that is saved at the relevant client computer. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

The decode, analysis, and re-encode module 224 and the security server system 202 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 224 may be adapted to apply different modifications to each instance of a common web resource, or common portion of a web resource, such that the web code that it is ultimately delivered to the client computers in response to each request for the common web resource includes different modifications.

Even where different modifications are applied in responding to multiple requests for a common web resource, the security server system 202 can apply the modifications in a manner that does not substantially affect a way that the user interacts with the resource, regardless of the different transformations applied. For example, when two different client computers request a common web page, the security server system 202 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212, 214. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

A central security console 208 may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3A:
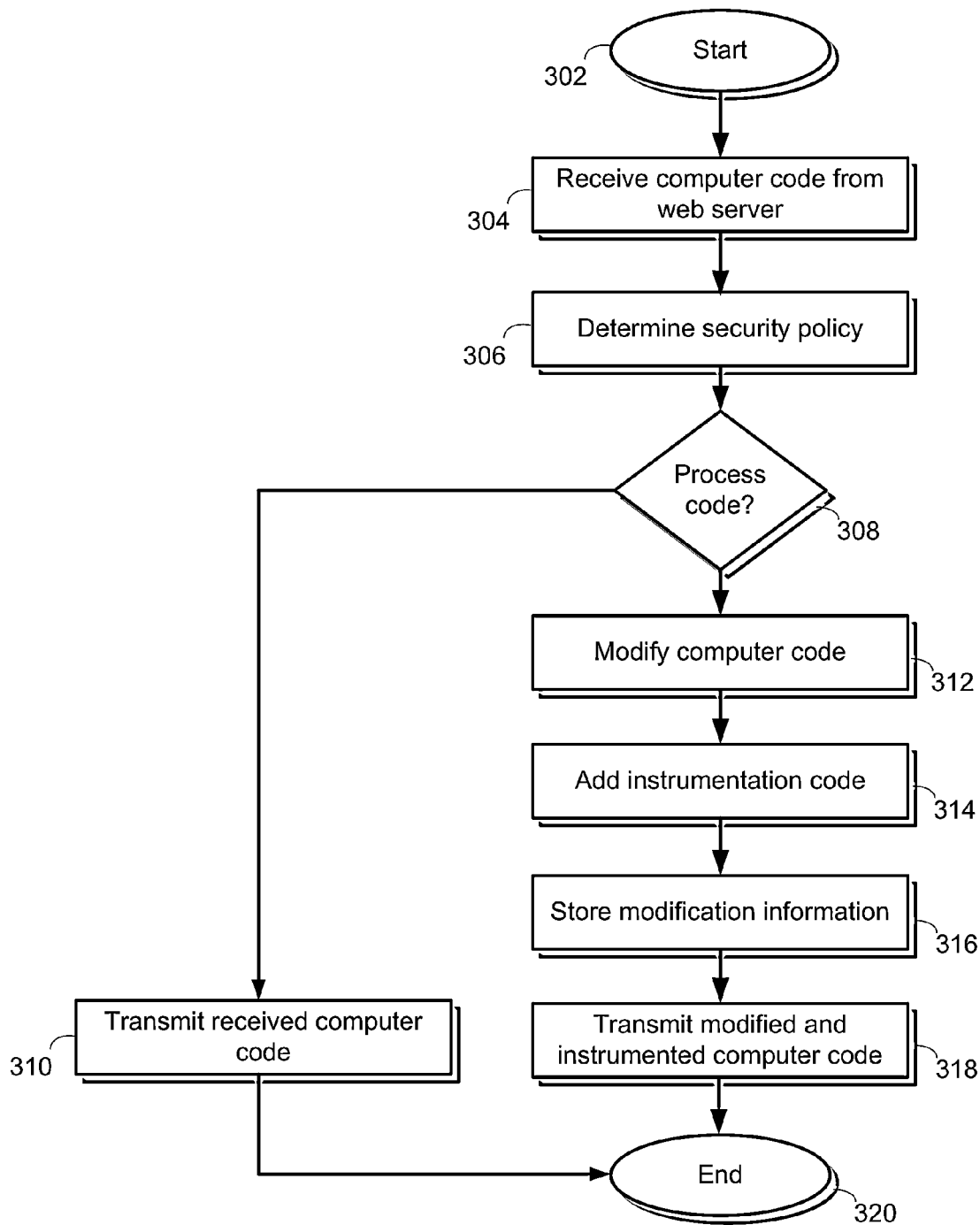
FIG. 3A is a flow chart of a process for serving modified and instrumented program code.

FIG. 3A is a flow diagram of a process for serving modified and instrumented program code. In general, the process involves intercepting code that would otherwise be served directly to a client device, and (a) modifying the code both by making changes that interfere with malicious attempts to interact with the web server through the client, and (b) supplementing the code with instrumentation code that is programmed to identify certain actions with respect to the served code, such as efforts to access the served code in a manner that only makes sense for the unmodified code (but not the modified code), such as attempts t make calls with names or parameters that are in the unmodified code but not the modified code. The modified and instrumented code can perform detection and deflection of anomalous and/or malicious computer activity. For example, in internet-based communication between a client computing device and a web server, the process can modify and instrument web code such as HTML, CSS, and JavaScript to detect abnormal activity by malware that exploits vulnerabilities of the client computing device.

At 302, the process starts, and at 304, a server subsystem receives web code from a web server in response to a request from a client computing device. In some implementations, the server subsystem corresponds to the security intermediary 102 in FIGS. 1A and 1B. The server subsystem may be a virtual component of computer hardware that implements the web server, or the server subsystem may be separate from the web server. In some embodiments, the server subsystem may be installed on the premises of the web server and communicate over a local area network or direct communication lines. The server subsystem can also be hosted by a third-party at a remote location from both the client device and the web server, such that the server subsystem and the web server communicate over a public network (e.g., the internet) or a private network.

In some implementations, the server subsystem can function as a reverse proxy so that client requests to the web server are first directed to the server subsystem and then forwarded to the web server, and content that the web server provides is forwarded to the server subsystem before being transmitted to a requesting client device. Web code includes data that is transmitted between the client computing device and the web server, such as HTTP requests and code for generating web pages such as HTML, XML, JavaScript, and CSS. The techniques described herein can also apply to other forms of web code including particular content technologies such as Flash/ActionScript, VBScript, Python, and Java Applets. In some implementations, the techniques described here can apply in the context of other network transfer protocols such as the file transfer protocol (FTP), HTTP secure (HTTPs), and others.

When the web server receives a request from a client computing device, the web server generates a response and forwards the response to the server subsystem. In some instances, the web server may respond with a resource that is stored on or accessible to the web server. The web server may also execute software on the server to generate a resource. The resource may correspond to a web site hosted by the web server, such as an HTML file for a particular page. Some resources may reference other resources, causing the client computing device to make subsequent requests for the other resources such as separate JavaScript or CSS files. If the web server is unable to satisfy the request, it may respond with an error indicator.

At 306, the server subsystem determines a security policy that governs the transaction and that indicates whether to process a resource before transmitting it to the client, and if so, how to process the resource. A policy engine in the server subsystem can generate or identify the appropriate security policy, which may be based on one or more factors such as the nature of the resource, system configuration settings, and characteristics of the requesting client device. For example, resources may be categorized into families in which a given security policy applies to each family of resources. Categorization may be performed manually to one or more particular resources, or may be based on a logical location of the resource in one example. Thus, resources within a family of URLs may be subject to a common security policy. Some resources can bypass any modification or further processing by the server subsystem, for instance, if they are deemed low-risk for exploitation.

At 308, if the security policy informs the server subsystem to forego further processing of the web code for the resource, then the server subsystem may transmit the resource and its associated web code to the client device (310). Such transmission may occur as to a portion of resources served for a transaction or for all resources.

If the server subsystem determines that web code for the resource should be processed further (308), it may apply various modifications to the web code to obscure operation of the web server (312), as viewed from a client computing device. In some implementations, the server subsystem may modify all or portions of a resource's implicit API. An implicit API can include any elements of the provided resource that are used by a client computing device in generating a response to the resource. For web pages, the implicit API may include links, form data, form fields, and AJAX calls, among other things. The server subsystem may replace values associated with the implicit API with other values that obscure the original values provided from the web server. The replacement values can be generated by various methods including methods for generating pseudo-random values. For example, the server subsystem may modify a link in an html file from original code that provided <a href="securepage.html"> to <a href="Pr&4@k78">. The modification may prevent malware at a client computing device from determining the actual target of the link. When a user selects the link, the client computing device generates an HTTP request for the obscured replacement page rather than "securepage.html." Similar modifications may be made to forms, fields, AJAX calls, and other portions of a resource's implicit API.

The server subsystem can also make other types of modifications on web code before delivering a resource to a client computing device. For example, the server subsystem may add elements, substitute, or delete elements to obscure the arrangement and static structure of a website. Client-executable code may also be added to the web code that can perform modifications to a resource, such as changing a web page's document object model, at the client device automatically or upon some triggering event. Some malware may attempt to infer the identity of various components of a webpage by examining the arrangement of the page, to see how components interrelate. By rearranging this structure and introducing various hooks into the web code, the server subsystem can make it more difficult for malware at a client device to determine characteristics and structure of a website and engage in unauthorized activity with the site. In some implementations, this may include changing JavaScript functions and variables such as "document.write," "document.getElementById( )" "document.getElementByName( )" "document.getElementByTagName( )" "document.evaluate( )" etc.

The server subsystem can apply modifications that do not impact a user's experience in interacting with the resource. For example, if the user has requested a particular web page, the web page can be modified so that the modifications to the web code are generally transparent to the user. Thus, modifications to the web page generally will not affect the visible structure of the page, and the page can maintain the same functionality and other elements of a user's experience with the page as the unmodified page would present. For example, the server subsystem may replace the target in a link in a modified page, and although the user may notice that the URL does not appear to be connected to the site that he or she has visited, the text, location, and functionality of the link are all maintained. Selecting the link will still direct the user to intended target of the link, for example.

For some modifications, including those made on the implicit API of a resource, the modifications may be reversible. Reverse modifications may be necessary to decode a request based on a modified webpage. For example, if the server subsystem changed the target of a link from "securepage.html" to "Pr&4@k78", and the user later selects the link and requests a resource identified by the obscured target "Pr&4@k78," it becomes necessary to determine the original value that was replaced so that the web server can satisfy the user's intended request. In some implementations, each modified resource can be served by the server subsystem with a cookie added to the HTTP header, or some other identifier for the resource, that can be sent back to the server system in a request based on the modified page. The server subsystem can use the cookie or other identifier to access a table, database, or other data structure corresponding to the identifier that contains information for decoding the request. For instance, a translation table in the server subsystem for the webpage in the foregoing example may show that the original value for "Pr&4&k78" was "securepage.html," and this value can be replaced in the request for the web server.

The server subsystem can apply different modifications to a resource each time that it is served. Operations of the web server can be obscured more effectively by changing the modifications to a resource each time it is served and before the resource is received by the client device to prevent malware from learning about the structure of a site. Changing the modifications each time that the web server provides a resource can make it more difficult for malware on the client device to determine a static structure of the site because the modifications create a moving target. Different modifications can be made to a common resource requested by multiple client devices so that each requesting client device is served with the resource with unique modifications. Even for a single user at one client device, the server subsystem can apply different modifications to a requested resource across multiple sessions. The server subsystem can apply unique modifications to a resource for each session. For the purposes of applying different modifications across multiple sessions, the sessions can correspond to sessions that are set by the web server, such as a session cookie that is sent from the web server in association with a resource and that may expire in a predetermined time and/or when a user closes a browser window at the client device, for example.

In some implementations, the server subsystem may also create other sessions for purposes of the server subsystem's operations instead of the web server. For example, the server subsystem may include a cookie that was not included in the content associated with a resource from the web server, and that can be set to expire in a predetermined amount of time or in association with a user's browsing activity. The session identifier can also be used by the server subsystem for determining a translation table to apply for decoding a resource (i.e., reverse modifications). In some implementations, the server subsystem may consider a session to have expired when it receives a request from a client device in response to a previously modified resource that the server subsystem sent to the client.

At 314, the server subsystem may supplement a resource provided by the web server in response to a request from a client device with instrumentation code. The instrumentation code may be executable on the client device and can detect abnormal computer behavior, which may result from malware that has infected the client device, software bugs, or even user-authorized plug-ins for example. Some abnormal behavior may be anomalous but benign, whereas other behavior, such as that from malware, may be malicious and represent a security threat to the web server. The instrumentation code may detect various types of abnormal behavior and report the detected abnormalities back to the server subsystem and/or the web server. In some instances, the instrumentation code may distinguish between benign and malicious activity and only generate an alert for malicious activity.

Some instrumentation code can use the modifications made by the server subsystem in detecting abnormal activity. For example, the server subsystem may replace all the values in a web page's implicit API before transmitting the web page to a client device. The instrumentation code may be configured to recognize if the client device attempts to use one of the replaced values, or any other value, rather than the replacement value. For instance, in the above example about the replaced link target, the instrumentation code may detect abnormal activity if the client generated an HTTP request in response to the modified page that included a request to "securepage.html" rather than "Pr&4&k78."

At 318, the server subsystem provides the modified and instrumented web code to the requesting client device. The code may be transmitted over a network such as the internet to the client computing device. In some instances, secure communication protocols can be used between the client device the server subsystem to authenticate the communication and protect against eavesdropping attacks. For example, the server subsystem may send the web code over an encrypted connection using HTTPs.

Figure 3B:
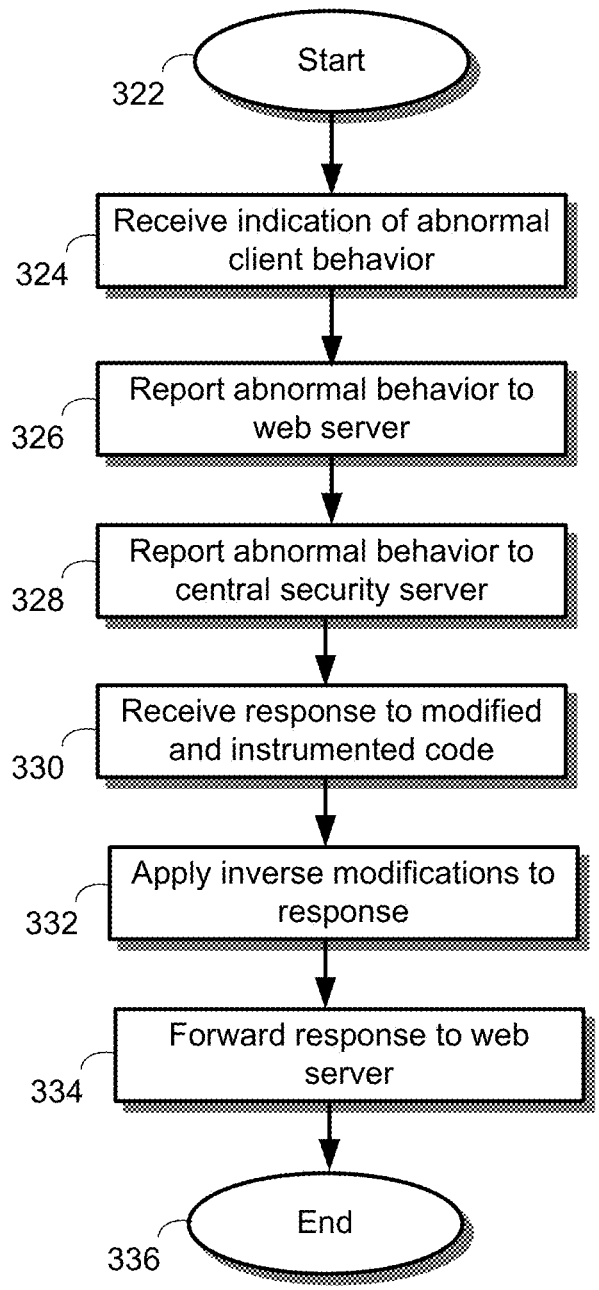
FIG. 3B is a flow chart of a process for monitoring operations of modified and instrumented program code and reporting abnormal behavior.

FIG. 3B depicts a flow chart of an example process for monitoring client devices for abnormal activity. In general, the process indicates actions that occur when a user interacts with a web page generated from the code delivery of FIG. 3A, with information about a user request and additional data generated by the instrumented code being sent to the server system. The flow chart in 3B logically continues from the end 320 of the flow chart depicted in FIG. 3A in which the server subsystem has transmitted modified and instrumented web code for a requested resource to a client device.

At 322, the process begins, and at 324, the server subsystem receives an indication that abnormal activity has occurred on the client device. In some implementations, the indication may be received from the instrumentation code that the server subsystem supplemented the web code with at 314. The instrumentation code can execute on the client device 118 while the client has executed the modified and instrumented version of the requested resource. When the instrumentation code detects abnormal behavior, it may generate a report and provide the report to the server subsystem.

The report may contain various information about the detected event such as the time at which it was detected, how many times the event was detected, and information about the nature or consequences of the event. For example, the instrumentation code may detect that the DOM for a web page has been altered such that, in combination with the modifications from the web server, the page does not function properly. The report may also indicate whether the abnormal behavior is more likely legitimate or malicious, and may provide a score that indicates the likelihood that the event stems from operations of a bot or other malware. To allow for subsequent analysis of the event, the report may provide other circumstantial information such as an identity of the client, the application or web browser in which the event occurred, a session identifier, a network identifier, and/or a resource or website identifier. In some implementations, the report may include a flag that indicates only that some abnormal or suspicious activity has been detected.

At 326, the server subsystem reports to the web server that it has received an indication of abnormal behavior to the web server. The web server may use the report from the server subsystem to modify a manner in which a transaction with the client device is handled. In some instances, transactions such as electronic funds transfers at a banking website, or authentication transactions more generally, may relate to sensitive information or matters in which security is paramount. In such cases, the web server may be configured to refuse to execute the transaction as requested. Alternatively, the web server may log the reported event but still complete the transaction. In some cases, the web server may also alter terms of the transactions, or notify authorized users, account holders, and/or a fraud or IT security department of the abnormal behavior, for instance. In some implementations, the web server may respond as if the transaction completed without actually completing the transaction.

The server subsystem can also transmit information about reported abnormal behavior to a central security server. The central security server may be implemented in some examples by security server 108 in the system 100 depicted in FIG. 1B. The central security server can be a separate server from the web server and the server subsystem and may be connected to multiple server subsystems associated with a plurality of web servers and web sites. In some examples, web server or web site operators may purchase or lease a server subsystem to operate with their respective web server(s) from an internet security authority. The central security server can be maintained by the internet security authority to monitor operations of the server subsystems and to collect information about detected abnormal behaviors.

Because the central security server can receive security reports from multiple server subsystems, data may be aggregated across multiple web sites, web servers, computing sessions, client devices, networks, and/or users. The internet security authority that maintains the central security server can use the reported information about abnormal activity for various purposes. For instance, the central server data may indicate how effectively the instrumentation code detects abnormal activity on client devices, or how effective web code modifications by the server subsystem are at obscuring information about a web site and preventing malicious transactions. The aggregated data may also be used to identify and classify particular reported behaviors as being associated with a legitimate or benign behavior such as an authorized browser plug-in, or if the behavior is more likely a malicious attack. The data may also be used, for example, to improve the algorithms and operation of the server subsystems to improve performance and detection and deflection capabilities.

At 330, the server subsystem receives a request from a client device in response to previously served modified and instrumented web code. For example, the client device may receive an HTTP response that includes modified names for form fields in an HTML document that was previously served on the client device. For instance, a user may have submitted a query in a web page using a text field in which its original name value of "search_bar" had been modified and replaced to "$fad&6." The server subsystem receives the request based on the modified and instrumented code before the request is forwarded to the web server. The instrumentation code may also include information in the request that indicates whether abnormal activity was detected, and if so, a report about the abnormal activity.

At 332, the server subsystem decodes the received client request so that the request can be forwarded to the web server in a format that the web server understands. The server subsystem can decode such requests by applying reverse modifications to the request. For example, the server subsystem may have stored information about modifications for a resource in a data structure, table, or database that can be identified based on a unique identifier for each served resource. The identifier can be included by the server subsystem in providing the client devices with modified and instrumented code, such as in a cookie, that the client device includes in subsequent HTTP requests that respond to the modified and instrumented code. Using the identifier, the server subsystem can locate the relevant modification information in the data structure, table, or database and generate a decoded request based on the stored modification information.

In some implementations, the server subsystem can implement stateless modification and decoding techniques such that the server subsystem does not need to store information about previous modifications on the server subsystem. For example, the server subsystem can transmit the information needed to decode requests based on modified and instrumented web code to the client in an encrypted cookie that the server subsystem can then receive from the client in future requests from the client device.

At 334, the server subsystem forwards the client request to the web server. If the server subsystem received no indication of abnormal behavior from the client device, the request may be forwarded in such decoded form without additional modifications such that the operations of the server subsystem appear generally transparent to the web server. The decoded request is substantially equivalent to a request that the web server would receive if the server subsystem was not there. In some implementations, the server subsystem can include other information with the request that can indicate to the web server the status of the transaction or a status of the server subsystem. For instance, the server subsystem may include information that affirmatively indicates that the server subsystem is operating correctly, or information that indicates the server subsystem is not operating properly. The server subsystem may include information that indicates whether abnormal behavior was reported and the nature of any reported abnormal behavior. Thus, the server subsystem can receive a decoded request and respond appropriately based on information that the server subsystem supplemented with the forwarded request.

Figure 4A:
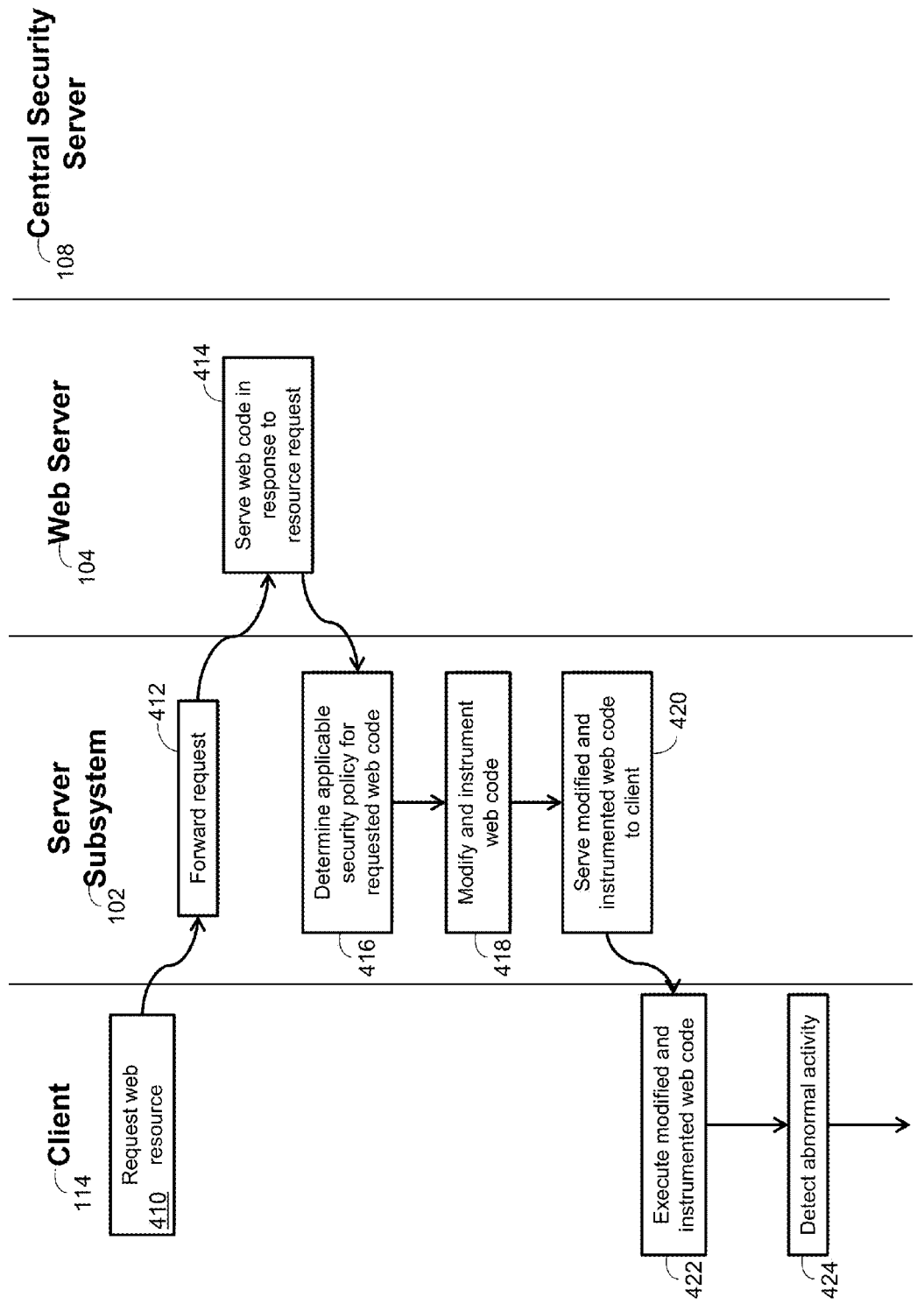
FIG. 4A-4B are swim-lane diagrams of a process for serving program code, modifying the code, and monitoring operation of the code on a client device.
Figure 4B:
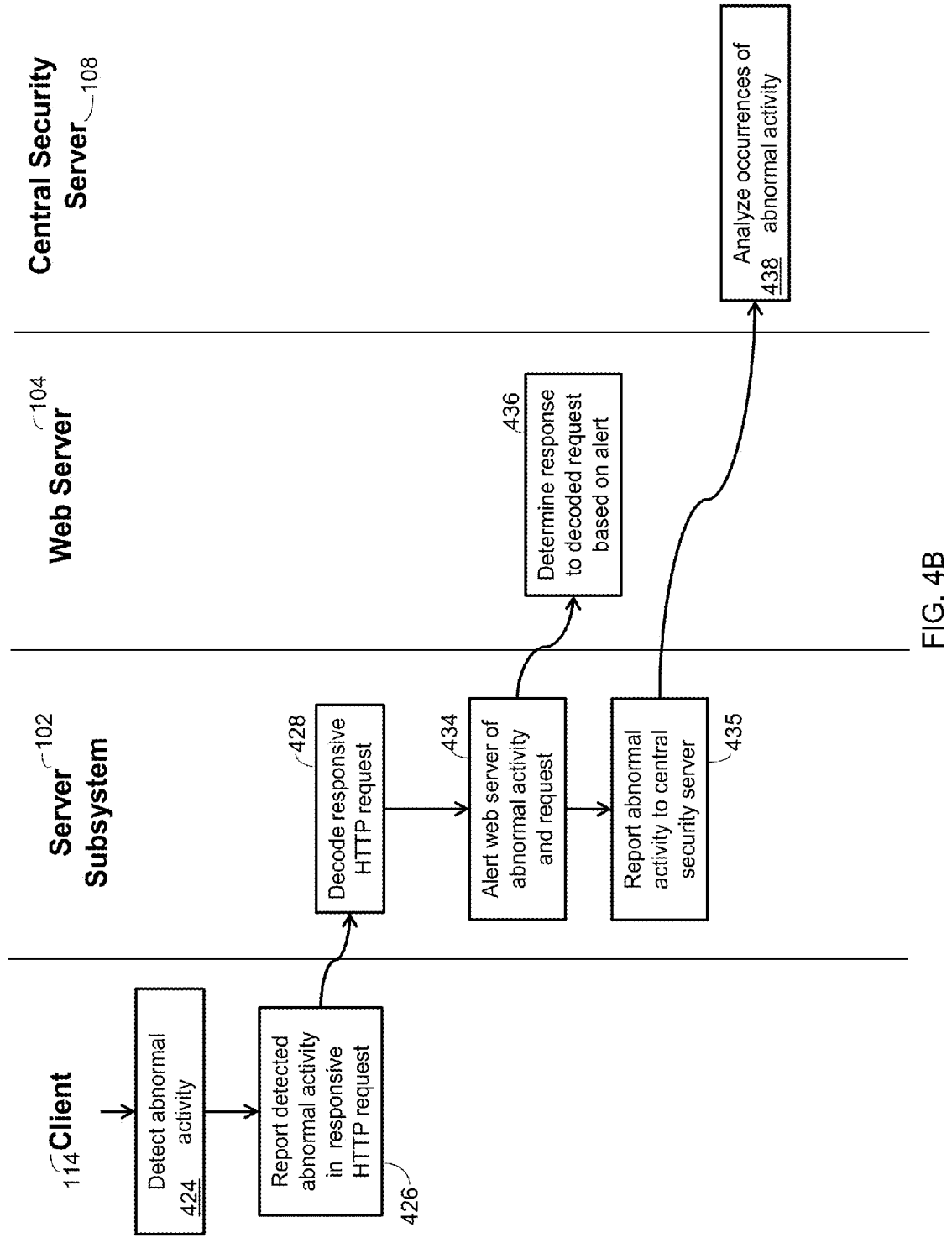

FIGS. 4A and 4B are swim-lane diagrams of a process for serving code, modifying and instrumenting the code, and monitoring operation of the code on a client device. Operations in the process occur between a computing client device 114 that has been infected with malicious code 118, a server subsystem 102, a web server 104, and a central security server 108. The server subsystem 102 may include the features of the server subsystem described in the process of FIGS. 3A and 3B, and/or the features of the security intermediary 102 described in FIGS. 1A and 1B. The numerical presentation of items from FIGS. 1A and 1B are provided here by means of example, while other structural implementations may be used as appropriate.

At 410, the client device 114 makes a request of the web server 104 for a resource, such as a web page on a website hosted by the web server 104. The request may be an HTTP request, for example, that is transmitted over the internet 110. The server subsystem 102 may function as a reverse proxy server such that the server subsystem 102 receives the request and, at 412, forwards the request to the web server 104. In some implementations, a load balancer 106 may function as a reverse proxy server rather than or in addition to the server subsystem 102, and can forward the request to the web server 104.

Upon receiving the request, the web server generates or accesses a resource to provide in response to the requesting client device 114. For example, the resource may be a web page defined by HTML code that is executable on the client device 114. At 414, the web server 104 sends the resource to the server subsystem 102. The server subsystem performs a preliminary analysis of the resource provided by the web server 104 and determines, at 416, a security policy that applies to the resource. The security policy may indicate whether the server subsystem 102 should modify the web code for the resource and/or whether to provide the resource to the client device 114 with instrumentation code that can detect abnormal activity at the client device 114.

At 418, the server subsystem 102 modifies and instruments the requested resource's web code according to the applicable security policy. The server subsystem 102 may use various techniques for randomly modifying web code and/or supplementing the web code with instrumentation code to detect and/or deflect abnormal and malicious program code on the client device 114. This document discusses such techniques throughout the specification, including with respect to FIG. 2, for example.

At 420, the server subsystem 102 serves the modified and instrumented web code to the client device 114. The modified and instrumented web code may be delivered to the client device 114 over a secure internet connection to authenticate one or more endpoints of the transaction and to protect against eavesdroppers.

The client device 114 receives and executes the modified and instrumented web code at 422. For web code that defines a web page, for instance, a web browser at the client device 114 can interpret the code, build a document object model, request any referenced files such as images, JavaScript, or CSS files referenced by the web code, and present the web page to a user.

As the user interacts with the executing resource code, at 424 the supplemented instrumentation code may detect any abnormal behavior that occurs on the client with respect to the executing resource code. For example, malicious code 118 that surreptitiously resides on the client device 114 and that has penetrated a security vulnerability in the client's 114 web browser, may attempt to alter the web page's DOM or generate an unauthorized HTTP request in a way that is inconsistent with the modified web code from the server subsystem 102. The instrumentation code can detect such behavior.

At 426, the client device may submit an HTTP request in response to the modified and instrumented code, which may include a report about detected abnormal activity generated by the instrumentation code. The report may include, for example, information about the state, identity, or context of the client device 114 and/or the web browser or other application in which the code is executing. The report may include an IP address, MAC address, or other network or device identifiers, and a session identifier. Information about the nature of the detected event may also be included such as how the abnormal activity (e.g., malicious code 118) attempted to interact with the modified resource executing on the client device 114.

The client device may transmit the HTTP request at 426 in response to a user's direction as indicated by interaction with the executing web page. For example, a link that the user follows from a web page or a request to post form data can prompt the HTTP request. The HTTP request may include information that allows the server subsystem to decode the request such as an encrypted transformation table or a session identifier to correspond to an identifier stored on the server subsystem 102.

At 428, the server subsystem 102 decodes the HTTP request from the client device 114. For instance, function values that were replaced during the modification process in serving the code may be restored to their original values as provided from the web server 104. Other techniques for decoding are discussed throughout this specification. The server subsystem 102 can maintain or log information about the reported occurrence of abnormal activity during the decoding process.

Based on the report from the instrumentation code, at 434, the server subsystem 102 may send an indication to the web server 104 that abnormal activity was detected on the client device 114 and that a user may not have legitimately authorized the HTTP request. In some implementations, the server subsystem 102 may be configured to not deliver a request to the web server 104 when the subsystem 102 has received an indication of detected abnormal client activity.

At 436, the web server 104 determines a response to the decoded request. The web server 104 may adjust its response based on an indication that abnormal or malicious activity occurred on the client device 114, which may indicate an attempt to engage in a fraudulent transaction with the web server 104, or to otherwise exploit the web server 104. For example, the web server 104 may respond by completing the transaction as requested, providing an error message, and/or refusing to complete the transaction. The web server 104 may also act as if the transaction completed when in fact it did not.

At 435, the server subsystem 102 may send information about the received report of detected abnormal activity to the central security server 108 immediately upon receipt of the report, or it may periodically send information about a plurality of reports that the server subsystem has received over a period of time. Alternatively, or in addition to such reporting, the central security server 108 may request that the server subsystem 102 provide information about detected abnormal activity, and the server subsystem may respond accordingly.

At 438, the central security server 108 analyzes information about abnormal client activity that it has received from the server subsystem 102, as well as from other similar systems that may serve other web domains. The central security server 108 may analyze multiple security reports generated by instrumentation code that executed on multiple client devices, for multiple users, and across multiple computing sessions, for example. For instance, central server 108 may use clustering techniques and statistical tools to abstract information about security threats, which information can be used to improve the capabilities of the server subsystem 102 to detect and obstruct future threats.

Figure 5:
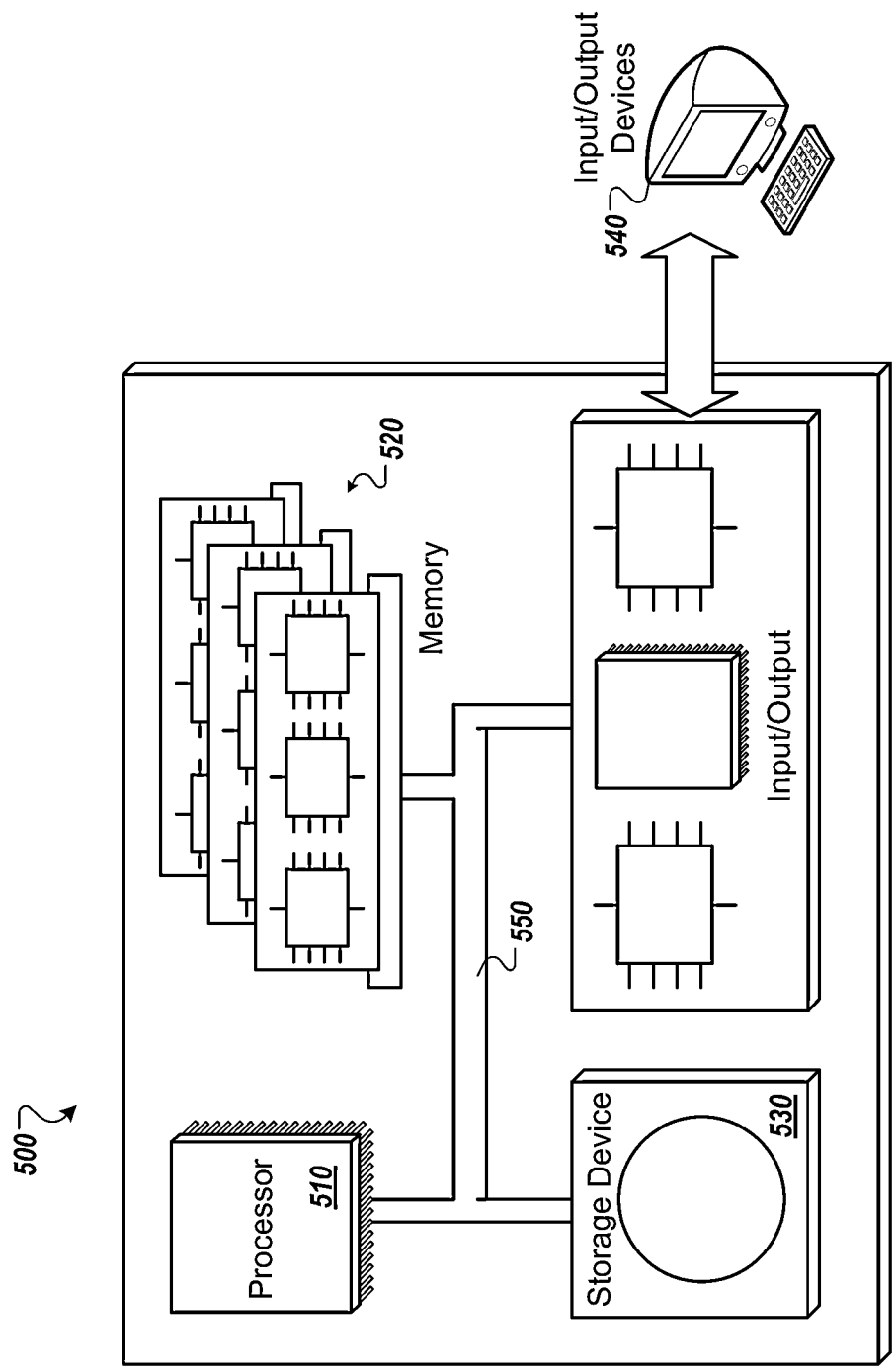
FIG. 5 is a block diagram of a generic computer system for implementing the processes and systems described herein.

FIG. 5 is a schematic diagram of a computer system 500. The system 400 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the subject matter may be embodied as methods, systems, devices, and/or as an article or computer program product. The article or computer program product may comprise one or more computer-readable media or computer-readable storage devices, which may be tangible and non-transitory, that include instructions that may be executable by one or more machines such as computer processors.

What is claimed is:

1. A computer-implemented security method, comprising:
    obtaining, by a computer server system, a common web resource that is to be served in response to requests from a plurality of different client devices;
    recoding portions of the common web resource in a manner that does not affect user perception of a presentation of the web resource on the plurality of different client devices, the recoding differing for different ones of the plurality of client devices;
    serving the web resource to the plurality of different client devices, wherein each of a plurality of instances of the served web resource includes:
        (i) the recoded portions, and
        (ii) instrumentation code that is configured to be executed on a corresponding client device to which the web resource is being served and to monitor interaction by other resources on the corresponding client device with the web resource;
    receiving, from the plurality of client devices, responses that result from the serving of the web resource, the responses having different content that depends on how a corresponding instance of the recoding of the portions of the web resource occurred for a particular one of the plurality of client devices; and
    decoding content in the responses from particular ones of the client devices in a manner that corresponds to a manner in which the portions of the web resource were recoded for the particular ones of the client devices.

2. The computer-implemented method of claim 1, further comprising receiving, from the instrumentation code that executes on the client devices, reports indicating that the instrumentation code detected abnormal behavior at particular ones of the client devices.

3. The computer-implemented method of claim 1, wherein particular ones of the reports include an indication that an un-recoded form of the web resource attempted to interact with the corresponding client device.

4. The computer-implemented method of claim 1, further comprising:
    receiving, from particular ones of the plurality of different client devices, requests that each respond to corresponding web resources having recoded portions and instrumentation code;
    modifying the received requests in a manner that is a functional inverse of the recoding of corresponding ones of the portions of the common web resource; and
    providing modified requests to one or more server systems that served the common web resources.

5. The computer-implemented method of claim 1, wherein recoding portions of the common web resource comprises changing names of functions in computer code for the common web resource to obscure operation of a web server system that generated the common web resource.

6. The computer-implemented method of claim 1, wherein recoding portions of the common web resource comprises changing values of attributes in computer code that makes up the common web resource.

7. The computer-implemented method of claim 1, wherein recoding portions of the common web resource comprises changing values associated with at least one of a link, a form, a field, and a function in an HTML document.

8. The computer-implemented method of claim 1, wherein recoding portions of the common web resource comprises at least one of adding, removing, and rearranging content in a web document.

9. The computer-implemented method of claim 1, wherein serving the web resource with the recoded portions to the plurality of different client devices includes associating each instance of the web resource that is served to a respective one of the plurality of different client devices with a corresponding session identifier, and wherein the received responses that result from serving the web resource include the corresponding session identifiers.

10. The computer-implemented method of claim 9, further comprising:
storing information about modifications made in recoding the common web resource in a data structure that is identifiable by the session identifier, and
wherein decoding the content in the responses includes identifying the data structure using the corresponding session identifiers in the received responses, and using the information about the modifications that is stored in the data structure.

11. The computer-implemented method of claim 1, wherein the computer server system is arranged to recode the common web resource in different manners across multiple different computing sessions from a single one of the plurality of client devices.

12. The computer-implemented security method of claim 1, wherein serving the web resource with the recoded portions to the plurality of different client devices comprises serving, to each of the plurality of different client devices, a respective version of the common web resource that has been recoded differently from other versions of the common web resource served to other ones of the plurality of different client devices.

13. The computer-implemented security method of claim 1, wherein recoding portions of the common web resource comprises randomly modifying the portions of the common web resource, wherein the common web resource is recoded differently for different ones of the plurality of client devices as a result of randomly modifying the portions of the common web resource for each of the plurality of client devices.

14. A computer system for identifying abnormal computer behavior, the system comprising:
a web server that is configured to provide a resource in the form of computer code to requesting client computing devices; and
a security intermediary arranged to
(i) receive the resource from the web server before the resource is provided to the requesting client computing devices,
(ii) process the received resource,
(iii) transmit the processed resource to corresponding requesting client computing devices, and
(iv) provide instrumentation code to corresponding requesting client computing devices with the processed resource, the instrumentation code programmed to monitor operation of the resource on corresponding requesting client computing devices,
wherein processing the received resource includes modifying the computer code for the received resource to obscure operation of the web server system, the modifying being different for different requests from clients for the received resource.

15. The computer system of claim 14, wherein the security intermediary is further arranged to receive, from the instrumentation code provided to particular ones of the corresponding requesting client computing devices, reports that the instrumentation code detected abnormal behavior at the particular ones of the corresponding requesting client computing devices.

16. The computer system of claim 15, wherein the report from a first corresponding client computing device includes an indication that the first corresponding requesting client computing device attempted to interact with an unmodified form of the computer code for the received resource.

17. The computer-implemented method of claim 14, wherein the instrumentation code is programmed to detect alien content interaction with a document object model at a corresponding client computing device.

18. The computer system of claim 14, wherein modifying the computer code for the received resource comprises changing names of functions in the computer code.

19. The computer system of claim 14, wherein the security intermediary is further configured to modify the computer code for the received resource differently in response to each of a plurality of requests from a particular one of the client computing devices.

20. The computer system of claim 14, wherein the security intermediary is arranged to process the received resource such that the processed resource, when executed by particular ones of the requesting client computing devices, presents a substantially consistent computing experience to users of the requesting client computing devices as a user experience for an unprocessed version of the resource.

21. The computer system of claim 14, further comprising a central security server that is configured to receive security information from a plurality of security intermediaries that includes the security intermediary and other security intermediaries, the security information characterizing information about execution of one or more processed web resources by client computing devices.

22. One or more tangible computer-readable devices having instructions stored thereon that, when executed by one or more processors of a computer system, perform actions comprising:
obtaining, by the computer system, a common web resource that is to be served in response to requests from a plurality of different client devices;
recoding portions of the common web resource in a manner that does not affect user perception of a presentation of the web resource on the plurality of different client devices, the recoding differing for different ones of the plurality of client devices;
serving the web resource to the plurality of different client devices, wherein each of a plurality of instances of the served web resource includes:
(i) the recoded portions, and
(ii) instrumentation code that is configured to be executed on a corresponding client device to which the web resource is being served and to monitor interaction by other resources on the corresponding client device with the web resource;
receiving, from the plurality of client devices, responses that result from the serving of the web resource, the responses having different content that depends on how a corresponding instance of the recoding of the portions of the web resource occurred for a particular one of the plurality of client devices; and
decoding content in the responses from particular ones of the client devices in a manner that corresponds to a manner in which the portions of the web resource were recoded for the particular ones of the client devices.

23. The tangible computer-readable devices of claim 22, wherein recoding portions of the common web resource comprises changing names of functions in computer code for the common web resource to obscure operation of a web server system that generated the common web resource.

24. The tangible computer-readable devices of claim 22, wherein serving the web resource with the recoded portions to the plurality of different client devices includes associating each instance of the web resource that is served to a respective one of the plurality of different client devices with a corresponding session identifier, and wherein the received responses that result from serving the of the web resource include the corresponding session identifiers.

25. A computer-implemented security method, comprising:
   receiving, at a computer system, a particular web resource that is to be served in response to respective requests from a first client device and a second client device;
   recoding the particular web resource to generate a first recoded resource that is to be served to the first client device, the recoding including modifying computer code for the particular web resource to obscure operation of a server that generated or provided the particular web resource without changing a user experience with the first recoded resource executed by the first client device as compared to a user experience with the particular web resource if the particular web resource was executed by the first client device without having been recoded;
   recoding the particular web resource to generate a second recoded resource that is to be served to the second client device, the recoding including modifying the computer code for the particular web resource to obscure operation of the server that generated or provided the particular web resource without changing a user experience with the second recoded resource executed by the second client device as compared to a user experience with the particular web resource if the particular web resource was executed by the second client device without having been recoded, wherein the second recoded resource is recoded differently than the first recoded resource;
   inserting instrumentation code into computer code for the first recoded resource, wherein the instrumentation code is configured to be executed at the first client device in conjunction with execution of the first recoded resource and to monitor interaction by other resources on the first client device with the first recoded resource;
   serving the first recoded resource, including the inserted instrumentation code, and the second recoded resource to the first client device and the second client device, respectively;
   receiving, from the first client device, a first response resulting from the first recoded resource, and decoding content in the first response in a manner that corresponds to a manner in which the particular web resource was recoded to generate the first recoded resource; and
   receiving, from the second client device, a second response resulting from the second recoded resource, and decoding content in the second response in a manner that corresponds to a manner in which the particular web resource was recoded to generate the second recoded resource.

26. The computer-implemented method of claim 25, wherein the instrumentation code is further configured to identify one or more features of the first client device and to report information about the one or more features of the first client device to a server system remote from the first client device.

* * * * *

UNITED STATES PATENT AND TRADEMARK OFFICE
CERTIFICATE OF CORRECTION

PATENT NO. : 8,869,281 B2  Page 1 of 1
APPLICATION NO. : 14/055646
DATED : October 21, 2014
INVENTOR(S) : Justin D. Call et al.

It is certified that error appears in the above-identified patent and that said Letters Patent is hereby corrected as shown below:

On The Title Page, Item (71)
Column 1, (Applicant), after "Security" insert -- , --.

In The Claims
Column 38, Line 11 (Claim 17), delete "computer-implemented method" and insert -- computer system --, therefor.

Column 39, Line 12 (Claim 24), delete "the of the" and insert -- of the --, therefor.

Signed and Sealed this
Twenty-first Day of July, 2015

Michelle K. Lee
*Director of the United States Patent and Trademark Office*